US012459256B2

(12) United States Patent
Miyazawa

(10) Patent No.: US 12,459,256 B2
(45) Date of Patent: Nov. 4, 2025

(54) LIQUID DISCHARGE APPARATUS

(71) Applicant: SEIKO EPSON CORPORATION, Tokyo (JP)

(72) Inventor: Makoto Miyazawa, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 223 days.

(21) Appl. No.: 18/531,769

(22) Filed: Dec. 7, 2023

(65) Prior Publication Data

US 2024/0190128 A1 Jun. 13, 2024

(30) Foreign Application Priority Data

Dec. 9, 2022 (JP) ................................. 2022-196863

(51) Int. Cl.
*B41J 2/045* (2006.01)
*B41J 2/14* (2006.01)

(52) U.S. Cl.
CPC ....... *B41J 2/04563* (2013.01); *B41J 2/04581* (2013.01); *B41J 2/14233* (2013.01)

(58) Field of Classification Search
CPC ......................... B41J 2/04563; B41J 2/04581; B41J 2/14233; B41J 2002/14354; B41J 2/04588; B41J 2/01; B41J 2/14201; B41J 29/393
See application file for complete search history.

(56) References Cited

U.S. PATENT DOCUMENTS

2022/0258472 A1 8/2022 Hirai et al.

FOREIGN PATENT DOCUMENTS

CN 102729623 A * 10/2012 .......... B41J 2/04563
JP 2022-124599 A 8/2022

* cited by examiner

*Primary Examiner* — Justin Seo
(74) *Attorney, Agent, or Firm* — Global IP Counselors, LLP

(57) ABSTRACT

There is provided a liquid discharge apparatus in which a temperature information output circuit to which a unit temperature signal output by a unit temperature measurement circuit included in a head unit that discharges a liquid to a medium based on a drive signal, and a head temperature signal output by a head temperature detection section of a print head and including head temperature information corresponding to a temperature of the print head are input, and which outputs a temperature information signal, corrects the head temperature information output as the temperature information signal based on unit temperature information and head temperature information which are input when a heat generation mechanism generates heat at a predetermined temperature.

8 Claims, 15 Drawing Sheets

| | | LD | MD | SD | ND |
|---|---|---|---|---|---|
| [SIH, SIL] | | [1, 1] | [1, 0] | [0, 1] | [0, 0] |
| S | T1 | H | H | L | L |
| | T2 | H | L | H | L |
| | T3 | L | L | L | H |

LIQUID DISCHARGE APPARATUS

The present application is based on, and claims priority from JP Application Serial Number 2022-196863, filed Dec. 9, 2022, the disclosure of which is hereby incorporated by reference herein in its entirety.

BACKGROUND

1. Technical Field

The present disclosure relates to a liquid discharge apparatus.

2. Related Art

A liquid discharge apparatus including a print head having a piezoelectric element, a pressure chamber, and a nozzle communicating with the pressure chamber is known. The print head changes a volume of the pressure chamber by driving the piezoelectric element to discharge a liquid supplied to the pressure chamber from the nozzle. As such a liquid discharge apparatus including the print head, a technology that realizes discharge control suitable for a temperature of ink by driving and controlling a piezoelectric element based on the temperature of ink stored in the print head is known.

For example, JP-A-2022-124599 discloses a technology in which a temperature measurement section that measures a temperature of a pressure chamber storing ink is provided inside a print head including a piezoelectric element, the pressure chamber, and a nozzle to make it possible to reduce a temperature difference between a temperature measured by the temperature measurement section and a temperature in the pressure chamber, and the measurement accuracy of the temperature of the ink stored in the pressure chamber can be improved.

However, JP-A-2022-124599 does not consider a variation in a temperature measurement characteristic of the temperature measurement section provided inside the print head, and there is room for improvement.

SUMMARY

According to an aspect of the present disclosure, there is provided a liquid discharge apparatus including: a head unit that discharges a liquid onto a medium based on a drive signal; and a heat generation mechanism, in which the head unit includes a print head that discharges the liquid based on the drive signal, a unit temperature measurement circuit that measures a temperature of the head unit as unit temperature information and outputs a unit temperature signal including the unit temperature information, and a temperature information output circuit to which the unit temperature signal and a head temperature signal including head temperature information corresponding to a temperature of the print head are input and which outputs a temperature information signal, the print head includes a piezoelectric element which includes a first electrode, a second electrode, and a piezoelectric body, in which the piezoelectric body is positioned between the first electrode and the second electrode in a stacking direction in which the first electrode, the second electrode, and the piezoelectric body are stacked, and which is driven by receiving the drive signal, a vibration plate that is positioned on one side of the piezoelectric element in the stacking direction, and is deformed by driving the piezoelectric element, a pressure chamber substrate that is positioned on one side of the vibration plate in the stacking direction, and is provided with a pressure chamber of which a volume changes due to deformation of the vibration plate, a nozzle that discharges the liquid in response to a change in the volume of the pressure chamber, and a head temperature measurement section that is positioned on the other side of the vibration plate in the stacking direction, measures the head temperature information corresponding to a temperature of the pressure chamber, and outputs the head temperature information as the head temperature signal, and the temperature information output circuit corrects the head temperature information output as the temperature information signal based on the unit temperature information and the head temperature information which are input when the heat generation mechanism generates heat at a predetermined temperature.

DESCRIPTION OF EMBODIMENTS

Figure 1:
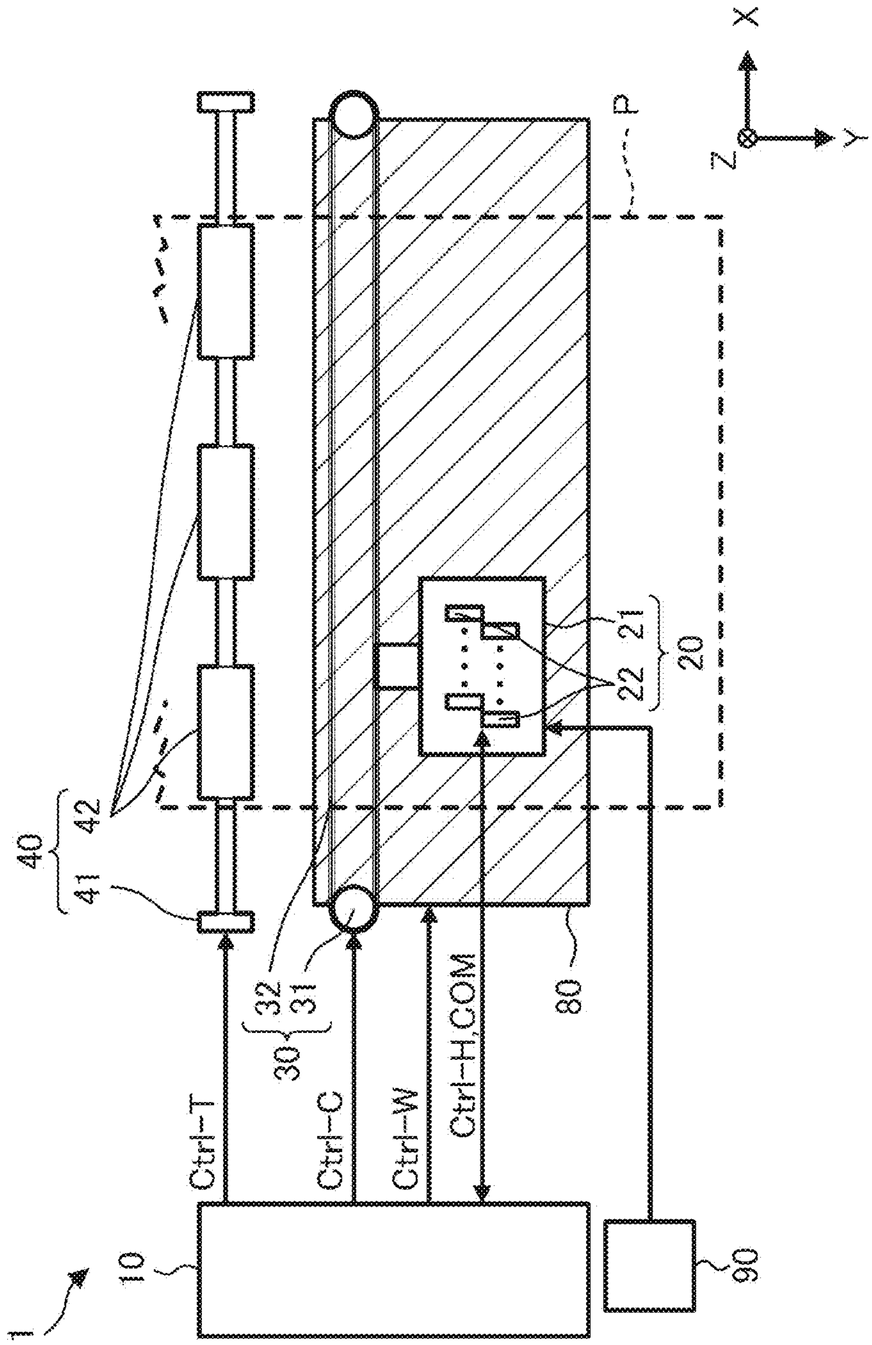
FIG. 1 is a view illustrating a schematic configuration of a liquid discharge apparatus.

Hereinafter, appropriate embodiments of the present disclosure will be described with reference to the drawings. The drawing to be used is for convenience of description. In addition, the embodiments which will be described below do not inappropriately limit the contents of the present disclosure described in the claims. In addition, not all of the configurations which will be described below are necessarily essential components of the present disclosure.

1. Structure of Liquid Discharge Apparatus

Structure of Liquid Discharge Apparatus

FIG. 1 is a view illustrating a schematic configuration of a liquid discharge apparatus 1. The liquid discharge apparatus 1 according to the present embodiment is a so-called serial printing type ink jet printer in which a carriage 21 on which a print head 22 that discharges ink as an example of a liquid is mounted reciprocates along a scanning axis and discharges the ink to a medium P that is transported in a transport direction to form a desired image on the medium P. As the medium P in the liquid discharge apparatus 1, any printing target such as a printing paper sheet, a resin film, or a cloth may be used. Note that the liquid discharge apparatus 1 is not limited to the serial printing type ink jet printer, and may be a line printing type ink jet printer. In addition, the liquid discharge apparatus 1 is not limited to an ink jet printer, and may be, for example, a coloring material discharge apparatus used for manufacturing a color filter such as a liquid crystal display, an electrode material discharge apparatus used for forming an electrode such as an organic EL display and a field-emission display (FED), a bioorganic substance discharge apparatus used for manufacturing a biochip, a 3D modeling apparatus, and textile printing apparatus.

Here, in the following description, an X axis, a Y axis, and a Z axis, which are three spatial axes orthogonal to each other, will be used for description. In the following description, when the respective directions of the X axis, the Y axis, and the Z axis are specified, the tip end side of an arrow indicating the direction along the X axis illustrated in the drawing is referred to as a +X side, and the starting point side is referred to as a −X side, the tip end side of an arrow indicating the direction along the Y axis illustrated in the drawing is referred to as a +Y side, and the starting point side is referred to as a −Y side, and the tip end side of an arrow indicating the direction along the Z axis illustrated in the drawing is referred to as a +Z side, and the starting point side is referred to as a −Z side.

As illustrated in FIG. 1, the liquid discharge apparatus 1 is provided with a control unit 10, a head unit 20, a moving unit 30, a transport unit 40, a heat generation unit 80, and an ink container 90.

A plurality of types of ink discharged to the medium P are stored in the ink container 90. As the ink container 90 in which such ink is stored, an ink cartridge, a bag-shaped ink pack made of a flexible film, an ink tank capable of replenishing ink, and the like can be used.

The control unit 10 includes a processing circuit such as a central processing unit (CPU) or a field programmable gate array (FPGA), and a memory circuit such as a semiconductor memory, and controls each element of the liquid discharge apparatus 1 including the head unit 20.

The head unit 20 includes a carriage 21 and a plurality of print heads 22. The carriage 21 is fixed to an endless belt 32 included in the moving unit 30 which will be described later. The plurality of print heads 22 are mounted on the carriage 21. In addition, a control signal Ctrl-H output by the control unit 10 and a drive signal COM are input to each of the plurality of print heads 22. Furthermore, the ink stored in the ink container 90 is supplied to each of the plurality of print heads 22 via a tube (not illustrated) or the like. The print head 22 discharges the ink supplied from the ink container 90 based on the input control signal Ctrl-H and the drive signal COM. At this time, the direction along the Z axis in which the print head 22 discharges ink, and the direction from the −Z side to the +Z side along the Z axis may be referred to as a discharge direction.

The moving unit 30 includes a carriage motor 31 and an endless belt 32. The carriage motor 31 operates based on a control signal Ctrl-C input from the control unit 10. The endless belt 32 extends along the X axis and rotates according to the operation of the carriage motor 31. As a result, the carriage 21 fixed to the endless belt 32 moves along the X axis. That is, the moving unit 30 reciprocates the plurality of print heads 22 mounted on the carriage 21 along the X axis. Here, in the following description, the direction along the X axis in which the plurality of print heads 22 mounted on the carriage 21 move may be referred to as a scanning direction.

The transport unit 40 includes a transport motor 41 and a transport roller 42. The transport motor 41 operates based on a control signal Ctrl-T input from the control unit 10. The transport roller 42 rotates according to the operation of the transport motor 41 in a state where the medium P is pinched therebetween. As a result, the medium P pinched between the transport rollers 42 is transported from the −Y side toward the +Y side along the Y axis. That is, the transport unit 40 transports the medium P from the −Y side toward the +Y side along the Y axis. Here, in the following description, the direction from the −Y side to the +Y side in which the medium P is transported may be referred to as a transport direction.

The heat generation unit 80 is positioned on the +Z side of the head unit 20 and supports the medium P transported by the transport unit 40 on the surface on the −Z side. In addition, the heat generation unit 80 generates heat based on a control signal Ctrl-W input from the control unit 10. The heat generation unit 80 heats the supported medium P by heat generated based on the control signal Ctrl-W. As a result, the medium P supported by the heat generation unit 80 and the ink landed on the medium P are dried. As a result, the fixability of the ink landing on the medium P is improved. That is, the heat generation unit 80 has a medium supporting function of supporting the medium P and a medium heating function of drying the medium P and the ink landed on the medium P.

In the liquid discharge apparatus 1 configured as described above, the moving unit 30 controls reciprocation of the carriage 21 along the scanning direction, and the transport unit 40 controls the transport in the direction along the transport direction of the medium P supported by the heat generation unit 80. The print head 22 mounted on the carriage 21 discharges the ink in conjunction with the reciprocation of the carriage 21 along the scanning direction and the transport of the medium P in the transport direction. As a result, the ink discharged by the print head 22 can land on any surface of the medium P, and a desired image is formed on the medium P. At this time, the heat generation unit 80 dries the medium P and the ink landing on the medium P. As a result, the fixability of the ink landing on the medium P is improved. As a result, the image quality formed on the medium P is improved. That is, the liquid discharge apparatus 1 of the present embodiment includes the head unit 20 that discharges the liquid onto the medium P based on the drive signal COM, and the heat generation unit 80.

Structure of Heat Generation Unit 80

Figure 2:
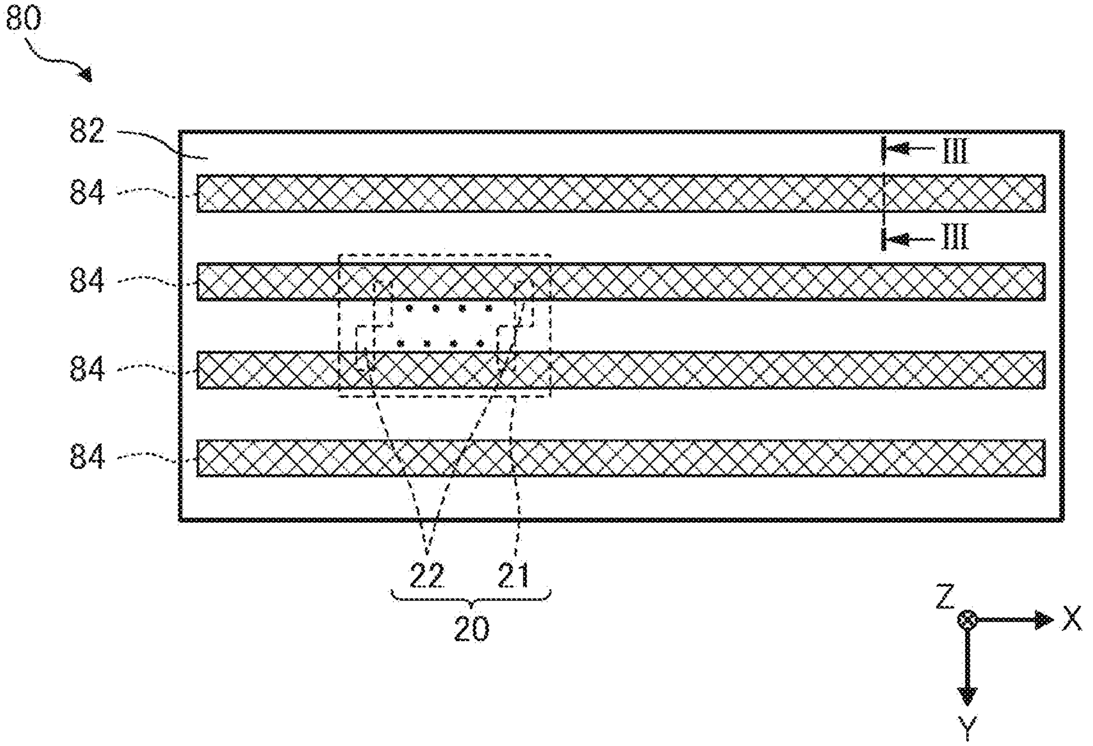
FIG. 2 is a plan view of a heat generation unit when viewed along a Z axis.

Next, a specific example of the structure of the heat generation unit 80 will be described. FIG. 2 is a plan view of the heat generation unit 80 when viewed along the Z axis. In addition, FIG. 2 shows the head unit 20 positioned on the −Z side of the heat generation unit 80 as broken lines. As illustrated in FIG. 2, the heat generation unit 80 includes a medium support section 82 and a plurality of heaters 84.

The medium support section 82 is a plate-shaped member extending along the XY plane including the X axis and the Y axis, and supports the medium P transported on the surface on the −Z side.

Each of the plurality of heaters 84 has a substantially rectangular shape including a long side extending along the X axis and a short side extending along the Y axis. The heater 84 is positioned such that the long side along the X axis is equal to or larger than the width of the transported medium P along the X axis, and the plurality of heaters 84 are arranged side by side along the Y axis in the heat generation unit 80. Further, the plurality of heaters 84 support the medium P transported together with the medium support section 82 on the surface on the −Z side. That is, the plurality of heaters 84 are positioned such that the surface on the −Z side thereof forms substantially the same plane along the XY plane as the surface of the medium support section 82 on the −Z side, and the medium P is transported along the same plane.

The plurality of heaters 84 disposed as described above heat the medium P supported by the surfaces on the −Z side of the plurality of heaters 84 and the surface on the −Z side of the medium support section 82. As a result, it is possible to improve the fixability of the ink to the transported medium P.

Specifically, some of the plurality of heaters 84 are positioned on the −Y side of the head unit 20 when the heat generation unit 80 is viewed along the Z axis. That is, some of the plurality of heaters 84 are positioned upstream of the head unit 20 in the transport direction in which the medium P is transported. The heater 84 positioned upstream of the head unit 20 heats the transported medium P with residual heat. As a result, the transported medium P is dried. As a result, the affinity of the ink discharged from the print head 22 with respect to the medium P can be enhanced.

In addition, some of the plurality of heaters 84 are positioned such that at least at a part thereof overlaps the print head 22 included in the head unit 20 when the heat generation unit 80 is viewed along the Z axis. That is, the heater 84 of the heat generation unit 80 is positioned to overlap with at least a part of the print head 22 in the direction along the Z axis in which ink is discharged from the nozzles of the print head 22. As a result, when the ink discharged from the print head 22 included in the head unit 20 lands on the medium P, it is possible to reduce the concern that the landed ink causes bleeding or the like.

Furthermore, some of the plurality of heaters 84 are positioned on the +Y side of the head unit 20 when the heat generation unit 80 is viewed along the Z axis. That is, some of the plurality of heaters 84 are positioned downstream of the head unit 20 in the transport direction in which the medium P is transported. The ink landed on the medium P is dried by the heater 84 positioned downstream of the head unit 20. As a result, the ink landing on the medium P is fixed on the medium P.

The disposition of the plurality of heaters 84 in the heat generation unit 80 is not limited to the disposition illustrated in FIG. 2 as long as the transported medium P can be heated. For example, when the long side of the heater 84 along the X axis is smaller than the width of the medium P transported along the X axis, the plurality of heaters 84 may be disposed in a staggered manner along the X axis. In addition, some of the plurality of heaters 84 may be positioned on the −Y side of the medium P.

Figure 3:
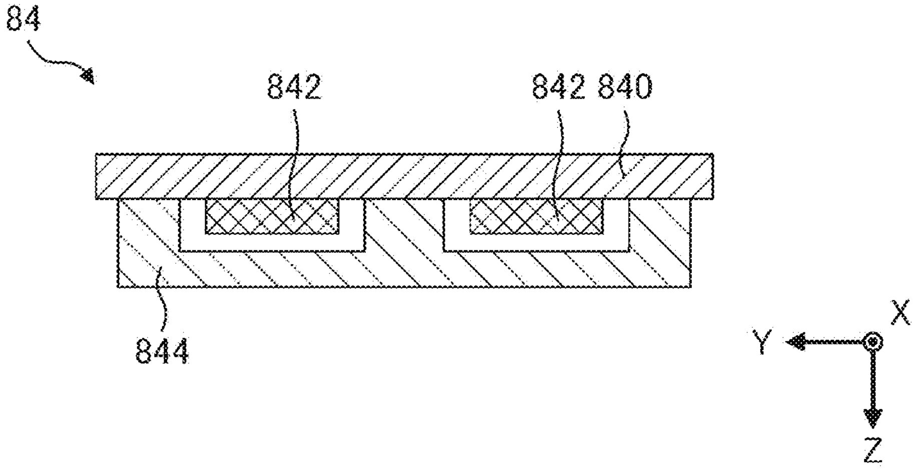
FIG. 3 is a sectional view taken along the line III-III illustrated in FIG. 2.

Next, a specific example of the structure of the heater 84 will be described. FIG. 3 is a view illustrating an example of the structure of the heater 84, and is a sectional view illustrating a cross section taken along the line III-III illustrated in FIG. 2. As illustrated in FIG. 3, the heater 84 includes a ceramic substrate 840, a heat generation resistor 842, and a protection member 844.

The ceramic substrate 840 is a plate-shaped member extending along the XY plane including the X axis and the Y axis, and the medium P is supported by the surface on the −Z side of the ceramic substrate 840. That is, the heater 84 is positioned such that the surface on the −Z side of the ceramic substrate 840 forms substantially the same plane along the XY plane as the surface on the −Z side of the medium support section 82. The ceramic substrate 840 conducts heat generated by the heat generation resistor 842. As a result, the medium P supported by the surface on the −Z side of the ceramic substrate 840 is heated. As the ceramic substrate 840, for example, a ceramic material such as aluminum oxide, silicon nitride, or aluminum nitride can be used. Aluminum oxide, silicon nitride, aluminum nitride, and the like have higher thermal conductivity than glass, for example, silica glass and the like. By configuring the ceramic substrate 840 containing aluminum oxide, silicon nitride, aluminum nitride, or the like having a high level of thermal conductivity, it is possible to efficiently conduct the heat generated by the heat generation resistor 842 (to be described later) as compared with the case where silica glass or the like is used. As a result, the temperature rise speed of the heater 84 and the temperature decrease speed can be increased.

That is, the heater 84 of the present embodiment is a ceramic heater that releases heat through the ceramic, and the heat generation unit 80 is configured to include the ceramic heater. As a result, the temperature rise speed and the temperature decrease speed of the heat generation unit 80 can be increased as compared with the case where the heat generation unit 80 is configured to include a silica glass heater made of silica glass or the like. As a result, the temperature of the transported medium P can be accurately controlled. As a result, the fixability of the ink to the medium P is improved, and the quality of the image formed on the medium P is improved.

Here, in general, in a ceramic heater using a ceramic substrate, when the area of the ceramic heater increases, there is a high possibility that the temperature varies depending on the part of the ceramic heater. Therefore, when the medium P is heated by using a single ceramic heater having a large area, there is a problem that it is difficult to accurately heat the entire medium P at a desired temperature. On the other hand, the heat generation unit 80 of the present embodiment heats the medium P by using the plurality of heaters 84. That is, the individual size of the heater 84 can be reduced as compared with the case where the medium P is heated by using a single ceramic heater. As a result, in the heat generation unit 80 of the present embodiment, the temperature of the entire medium P can be uniformly controlled as compared with the case where the medium P is heated by using a single ceramic heater.

Further, in the heater 84 according to the present embodiment, the ceramic substrate 840 is heated by using the plurality of heat generation resistors 842. As a result, the temperature of the ceramic substrate 840 can be uniformly controlled as compared with the case where the ceramic substrate 840 is heated by using the single heat generation resistor 842. As a result, the medium P transported on the surface on the −Z side of the ceramic substrate 840 can be heated more accurately.

The heat generation resistor 842 is a non-metal resistor that generates heat when energized, and for example, a so-called "carbon wire" configured to contain carbon fiber can be used. By using the non-metal resistor as the heat generation resistor 842, it is possible to reduce the concern that the heat generation resistor 842 is corroded by the ink as compared with the case where a metal resistor is used.

The protection member 844 is made of, for example, glass. In the present embodiment, since the protection member 844 is formed of glass, it becomes possible to suppress corrosion of the protection member 844 due to the ink, for example, compared to the case where the protection member 844 is formed of an organic material.

As described above, the heat generation unit 80 of the present embodiment includes the heater 84 that is a ceramic heater and has a medium drying function of drying the medium P. The heat generation unit 80 is positioned to overlap with at least a part of the print head 22 in the direction along the Z axis, which is the discharge direction in which the ink is discharged from the print head 22 included in the head unit 20. Since the heat generation unit 80 supports the medium P, the heat generation unit 80 is in the vicinity of the print head 22, and is preferably disposed such that the shortest distance from the nozzle plate 320 formed with nozzles 321 (to be described later) in the print head 22 is less than 1 mm. That is, the shortest distance between the nozzle plate 320 and the heat generation unit 80 is less than 1 mm. As a result, the medium P transported along the heat generation unit 80 passes in the vicinity of the nozzle 321 which is formed in the nozzle plate 320 and discharges ink, and the landing accuracy of the ink on the medium P can be improved.

Structure of Discharge Module

Figure 4:
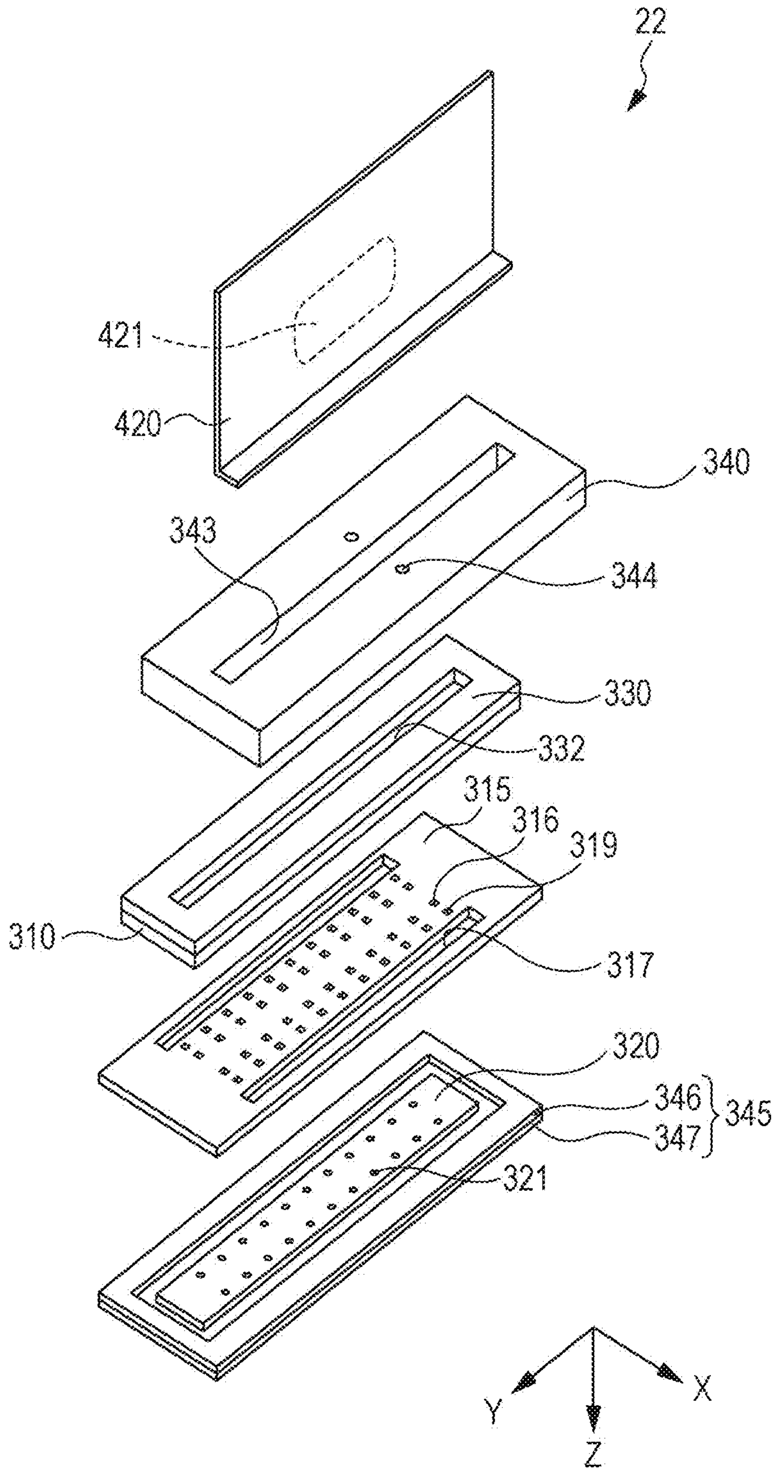
FIG. 4 is an exploded perspective view illustrating a configuration of a print head.
Figure 5:
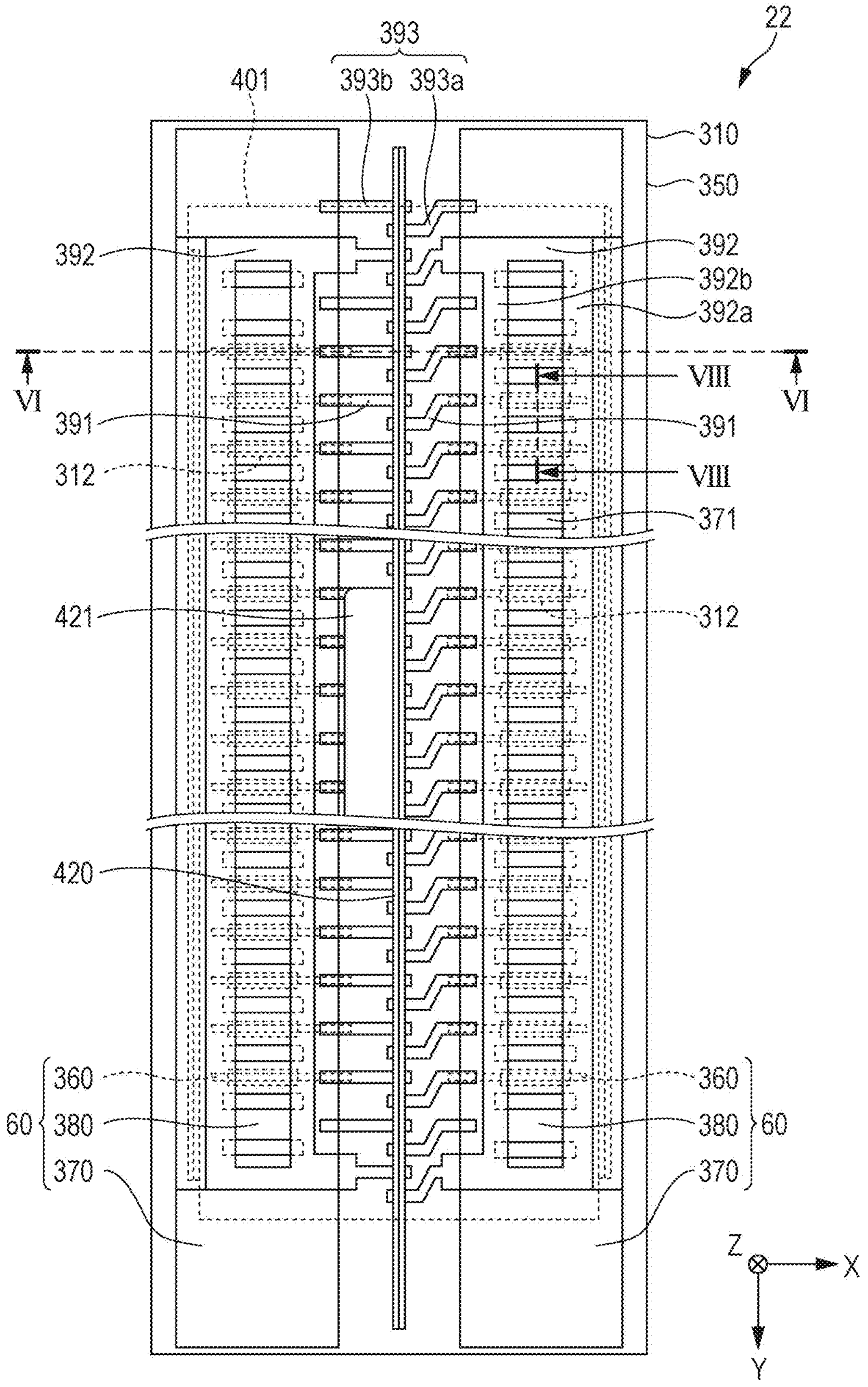
FIG. 5 is a plan view of the print head when viewed along the Z axis.
Figure 6:
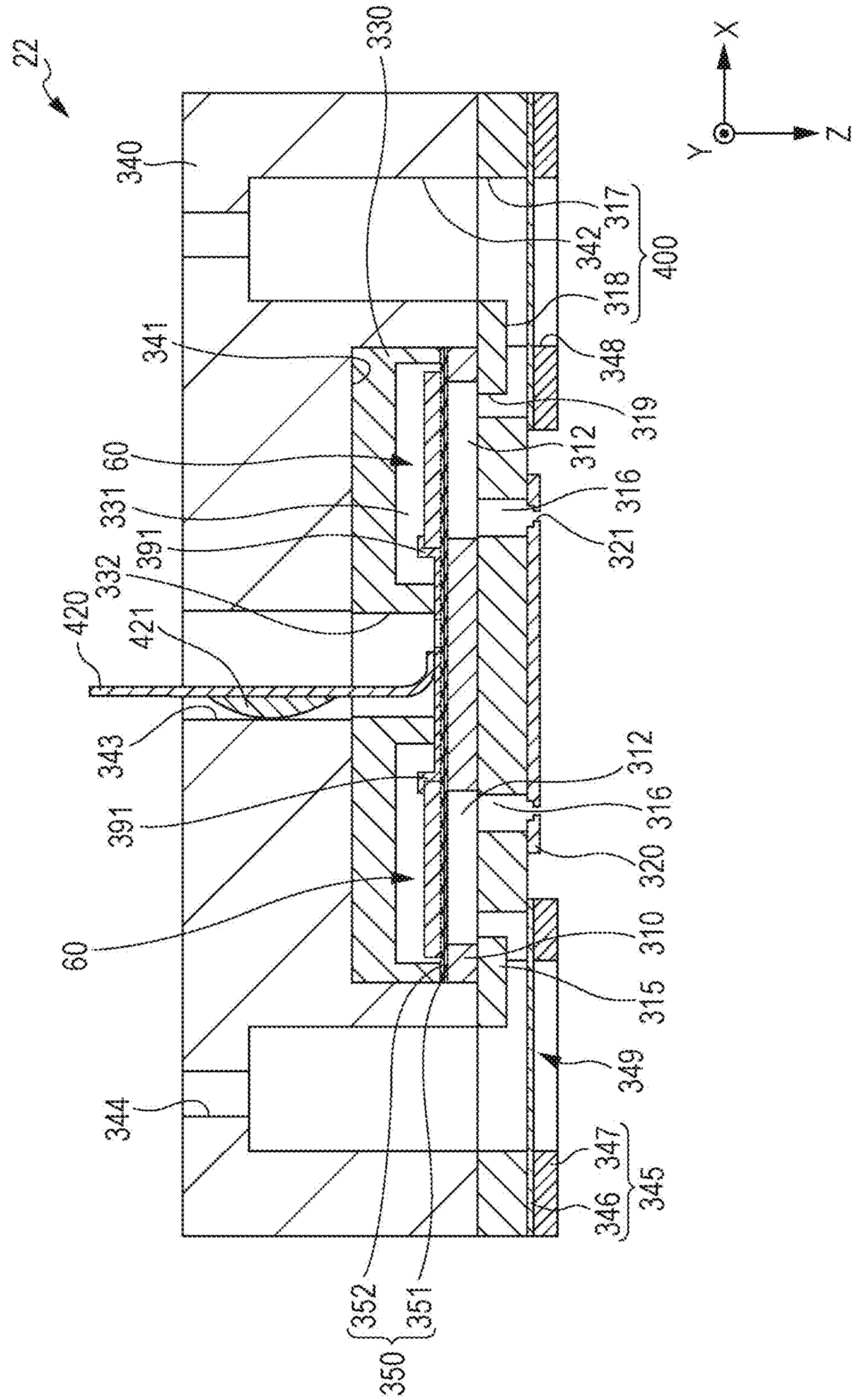
FIG. 6 is a sectional view taken along the line VI-VI illustrated in FIG. 5.
Figure 7:
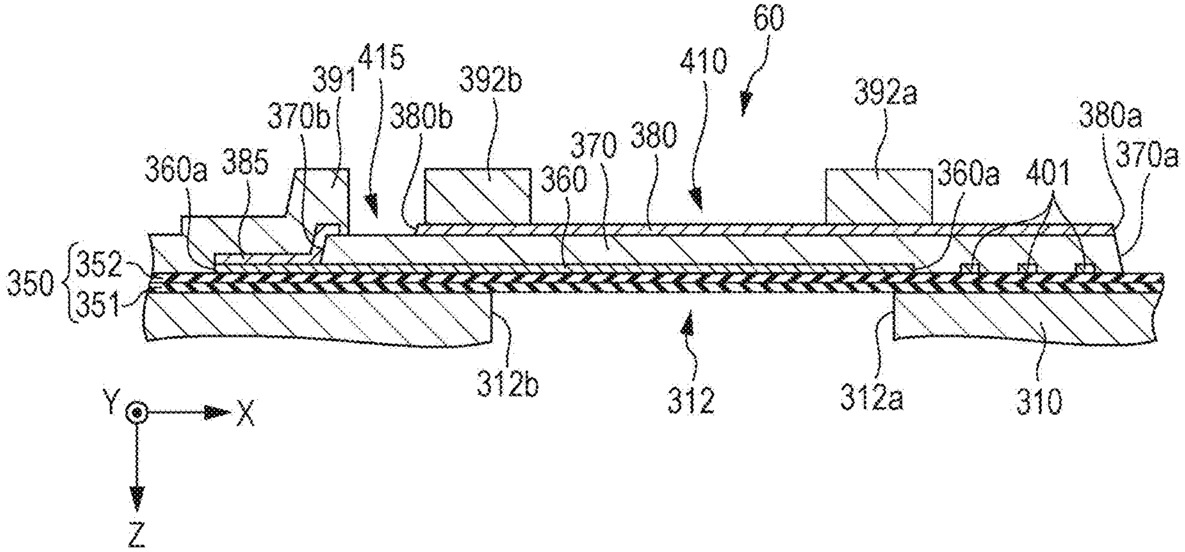
FIG. 7 is a main portion detailed view illustrating details of a main portion of FIG. 6.
Figure 8:
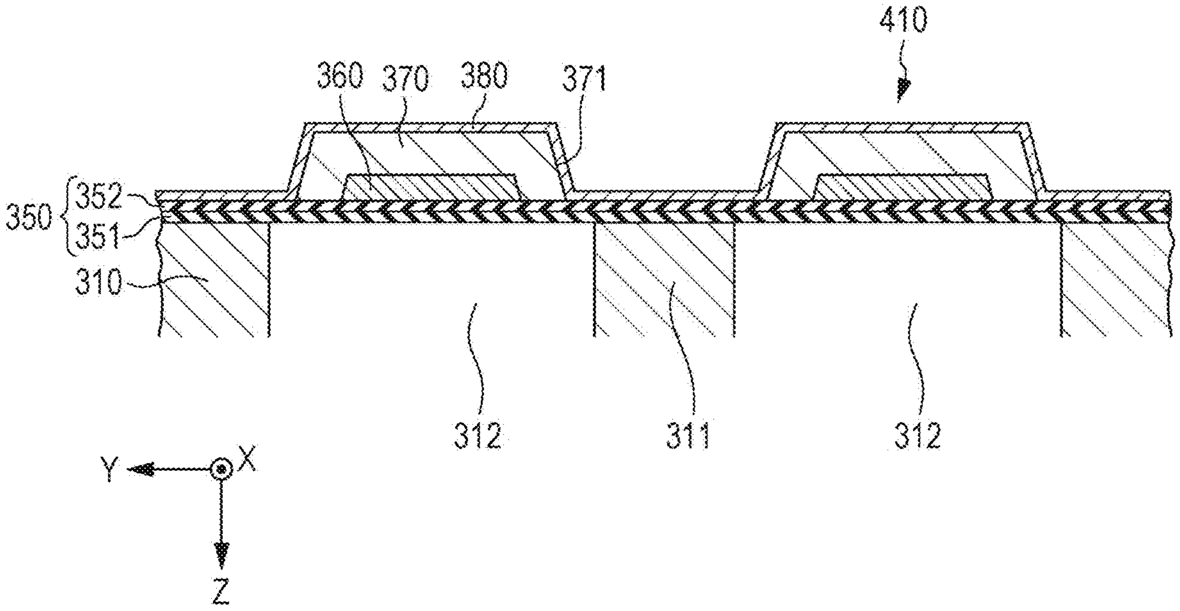
FIG. 8 is a sectional view taken along the line VIII-VIII illustrated in FIG. 5.

Next, an example of a structure of the print head 22 including the nozzle plate 320 in which the nozzle 321 is formed will be described. FIG. 4 is an exploded perspective view illustrating the structure of the print head 22, FIG. 5 is a plan view when the print head 22 is viewed along the Z axis, FIG. 6 is a sectional view illustrating a cross section taken along the line VI-VI illustrated in FIG. 5, FIG. 7 is a main portion detailed view illustrating details of the main portion of FIG. 6, and FIG. 8 is a sectional view illustrating a cross section taken along the line VIII-VIII illustrated in FIG. 5.

As illustrated in FIG. 4, the print head 22 includes a pressure chamber substrate 310, a communication plate 315, a nozzle plate 320, a compliance substrate 345, a vibration plate 350 that will be described later, a piezoelectric element 60 that will be described later, a protective substrate 330, a case member 340, and a wiring substrate 420.

The pressure chamber substrate 310 is formed of, for example, a silicon substrate, a glass substrate, an SOI substrate, various ceramic substrates, or the like. As illustrated in FIG. 5, on the pressure chamber substrate 310, two pressure chamber arrays in which a plurality of pressure chambers 312 are arranged along the Y axis are disposed along the X axis. Here, out of the two pressure chamber arrays, the pressure chamber array positioned on the +X side may be referred to as a first pressure chamber array, and the pressure chamber array positioned on the −X side of the first pressure chamber array may be referred to as a second pressure chamber array. Although FIG. 5 is a plan view of the print head 22 when viewed along the Z axis, the configuration around the pressure chamber substrate 310 is illustrated, and the protective substrate 330, the case member 340 and the like are not illustrated.

The plurality of pressure chambers 312 configuring each pressure chamber array are disposed on a straight line along the Y axis such that positions thereof in the X axis are the same position. The pressure chambers 312 adjacent to each other along the Y axis are partitioned by a partition wall 311 illustrated in FIG. 8. It is needless to say that the disposition of the pressure chambers 312 is not particularly limited, and for example, the disposition of the plurality of pressure chambers 312 arranged along the Y axis may be a so-called staggered disposition in which the plurality of pressure chambers 312 are shifted in the direction along the X axis for every other pressure chamber 312.

The pressure chamber 312 of the present embodiment is formed in a so-called rectangular shape in which a length in a direction along the X axis is longer than a length in a direction along the Y axis in plan view viewed from the +Z side. It is needless to say that the shape of the pressure chamber 312 in plan view from the +Z side is not particularly limited to a rectangular shape, and may be a parallel quadrilateral shape, a polygonal shape, a circular shape, an oval shape, or the like. The oval shape referred to here is a shape in which both end portions in a longitudinal direction are semicircular based on a rectangular shape, and includes a rounded rectangular shape, an elliptical shape, an egg shape, and the like.

As illustrated in FIG. 4, the communication plate 315, the nozzle plate 320, and the compliance substrate 345 are stacked on the +Z side of the pressure chamber substrate 310.

As illustrated in FIGS. 4, 6, and 7, the communication plate 315 is provided with a nozzle communication path 316 via which the pressure chamber 312 and the nozzle 321 communicate with each other. The communication plate 315 is provided with a first manifold section 317 and a second manifold section 318 that form a part of a manifold 400 that serves as a common liquid chamber with which the plurality of pressure chambers 312 communicate. The first manifold section 317 is provided to penetrate the communication plate 315 in the direction along the Z axis. The second manifold section 318 is provided to be open on the surface on the +Z side without penetrating the communication plate 315 in the direction along the Z axis.

Further, the communication plate 315 is provided with a supply communication path 319 communicating with one end portion of the pressure chamber 312 in the direction along the X axis independently for each of the pressure chambers 312. The supply communication path 319 causes the second manifold section 318 to communicate with each of the pressure chambers 312, and supplies the ink in the manifold 400 to each of the pressure chambers 312.

As the communication plate 315, a silicon substrate, a glass substrate, an SOI substrate, various ceramic substrates, a metal substrate, or the like may be used. Examples of the metal substrates include a stainless steel substrate. For the communication plate 315, a material having a thermal expansion coefficient substantially the same as that of the pressure chamber substrate 310 is preferably used. As a result, when the temperatures of the pressure chamber substrate 310 and the communication plate 315 change, it is possible to reduce the concern that the warpage occurs in the pressure chamber substrate 310 and the communication plate 315 due to the difference between the thermal expansion coefficients.

The nozzle plate 320 is provided on the surface on the opposite side to the pressure chamber substrate 310 of the communication plate 315, that is, on the +Z side. The nozzle plate 320 is formed with the nozzles 321 communicating with the respective pressure chambers 312 via the nozzle communication paths 316.

In the present embodiment, the print head 22 includes the plurality of nozzles 321, and the plurality of nozzles 321 are arranged side by side along the Y axis direction. Specifically, on the nozzle plate 320, two nozzle arrays in which the plurality of nozzles 321 are arranged in parallel are provided apart along the X axis. The two nozzle arrays correspond to the first pressure chamber array and the second pressure chamber array, respectively. In addition, the plurality of nozzles 321 in each array are disposed such that the positions in the direction along the X axis are in the same position. The disposition of the nozzles 321 is not particularly limited, and for example, the nozzles 321 disposed side by side in the direction along the Y axis may be disposed in positions shifted in the X axis direction for every other nozzle 321.

A material of the nozzle plate 320 is not particularly limited, and for example, a silicon substrate, a glass substrate, an SOI substrate, various ceramic substrates, and a metal substrate may be used. Examples of the metal substrates include a stainless steel substrate. In addition, the material of the nozzle plate 320 may be an organic substance such as a polyimide resin. However, for the nozzle plate 320, a material having substantially the same thermal expansion coefficient as that of the communication plate 315 is preferably used. As a result, when the temperatures of the nozzle plate 320 and the communication plate 315 change, it is possible to reduce the concern that the warpage occurs in the nozzle plate 320 and the communication plate 315 due to the difference between the thermal expansion coefficients.

The compliance substrate 345 is provided together with the nozzle plate 320 on the surface of the communication plate 315 on the opposite side to the pressure chamber substrate 310, that is, on the +Z side. The compliance substrate 345 is provided around the nozzle plate 320 and seals the openings of the first manifold section 317 and the second manifold section 318 provided in the communication plate 315. The compliance substrate 345 includes a sealing film 346 formed of a flexible thin film and a fixed substrate 347 made of a hard material such as metal. In addition, a region of the fixed substrate 347 facing the manifold 400 is an opening portion 348 completely removed in the thickness direction. Thus, one surface of the manifold 400 is a compliance section 349 sealed only by the flexible sealing film 346.

On the other hand, on the surface of the pressure chamber substrate 310 on the opposite side to the nozzle plate 320 or the like, that is, on the −Z side, the vibration plate 350 and the piezoelectric element 60 that bends and deforms the vibration plate 350 to cause a pressure change in the ink inside the pressure chamber 312 are stacked. In other words, the vibration plate 350 is provided on the +Z side in the direction along the Z axis with respect to the piezoelectric element 60, and the pressure chamber substrate 310 is provided on the +Z side in the direction along the Z axis with respect to the vibration plate 350. Note that FIG. 6 is a view for describing the overall configuration of the print head 22, and the configuration of the piezoelectric element 60 is simplified.

Further, the protective substrate 330 having substantially the same size as that of the pressure chamber substrate 310 is further bonded to the surface of the pressure chamber substrate 310 on the −Z side via an adhesive or the like. The protective substrate 330 has a holding section 331 which is a space for protecting the piezoelectric element 60. The holding sections 331 are spaces provided independently for each array of the piezoelectric elements 60 disposed side by side in the direction along the Y axis, and two holding sections 331 are formed side by side along the X axis. The protective substrate 330 is provided with a through-hole 332 penetrating in the direction along the Z axis between the two holding sections 331 disposed side by side in the direction along the X axis.

The case member 340 for defining the manifold 400 communicating with the plurality of pressure chambers 312 together with the pressure chamber substrate 310 is fixed on the protective substrate 330. The case member 340 has substantially the same shape as that of the communication plate 315 described above in plan view from the −Z side, and is bonded to the protective substrate 330 and also to the communication plate 315 described above.

The case member 340 has an accommodation section 341, which is a space having a depth that can accommodate the pressure chamber substrate 310 and the protective substrate 330, on the protective substrate 330 side. The accommodation section 341 has an opening area wider than the surface of the protective substrate 330 bonded to the pressure chamber substrate 310. The opening surface of the accommodation section 341 on the nozzle plate 320 side is sealed by the communication plate 315 in a state where the pressure chamber substrate 310 and the protective substrate 330 are accommodated in the accommodation section 341.

In the case member 340, third manifold sections 342 are defined on each of both outer sides of the accommodation section 341 in the direction along the X axis. The manifold 400 is configured with the first manifold section 317 and the second manifold section 318 provided on the communication plate 315, and the third manifold section 342. The manifold 400 is continuously provided in the direction along the Y axis, and the supply communication paths 319 via which each of the pressure chambers 312 and the manifold 400 communicate with each other are disposed side by side in the direction along the Y axis.

The case member 340 is provided with a supply port 344 that communicates with the manifolds 400 to supply ink to each of the manifolds 400. The case member 340 is provided with a coupling port 343 that communicates with the through-hole 332 of the protective substrate 330 and into which the wiring substrate 420 is inserted.

The print head 22 of the first embodiment takes the ink stored in the ink container 90 from the supply port 344. Then, after the inside from the manifold 400 to the nozzle 321 is filled with the ink, a signal based on the drive signal COM is supplied from an integrated circuit 421 to each piezoelectric element 60 corresponding to the pressure chamber 312. As a result, the vibration plate 350 is bent and deformed together with the piezoelectric element 60, the pressure in each pressure chamber 312 increases, and the ink is discharged from each nozzle 321.

Next, a configuration of the pressure chamber substrate 310 including the vibration plate 350 and the piezoelectric element 60 described above, which are stacked and formed on the −Z side, will be described in detail. The print head 22 has an individual lead electrode 391, a common lead electrode 392, a measurement lead electrode 393, and a resistance wiring 401 as a configuration stacked on the −Z side of the pressure chamber substrate 310, in addition to the vibration plate 350 and the piezoelectric element 60.

As illustrated in FIGS. 6 to 8, the vibration plate 350 includes an elastic film 351, which is made of silicon oxide, provided on the pressure chamber substrate 310 side, and an insulator film 352, which is made of a zirconium oxide film, provided on the elastic film 351. The liquid flow path of the pressure chamber 312 or the like is formed through anisotropic etching of the pressure chamber substrate 310 from the surface on the +Z side, and the surface of the liquid flow path of the pressure chamber 312 or the like on the −Z side is formed of the elastic film 351. The configuration of the vibration plate 350 is not particularly limited, may be formed of, for example, either the elastic film 351 or the insulator film 352, and may further include other films other than the elastic film 351 and the insulator film 352. Here, as the material of the other film constituting the vibration plate 350, for example, silicon, silicon nitride, and the like are used.

The piezoelectric element 60 functions as a piezoelectric actuator that causes a pressure change in the ink in the pressure chamber 312. The piezoelectric element 60 includes an electrode 360, a piezoelectric body 370, and an electrode 380 sequentially stacked from the +Z side that is the vibration plate 350 side toward the −Z side. In other words, the piezoelectric element 60 includes the electrode 360, the electrode 380, and the piezoelectric body 370, and the piezoelectric body 370 is provided between the electrode 360 and the electrode 380 in the direction along the Z axis in which the electrode 360, the electrode 380, and the piezoelectric body 370 are stacked.

Both the electrode 360 and the electrode 380 are electrically coupled to the wiring substrate 420. Then, a signal supplied from the integrated circuit 421 mounted on the wiring substrate 420 is supplied to the electrode 360, a signal having a reference potential propagating through the wiring substrate 420 is supplied to the electrode 380, and accordingly, a signal supplied from the integrated circuit 421 to the piezoelectric body 370 and a signal having a reference potential are supplied. Then, the piezoelectric body 370 is deformed by the potential difference generated between the electrode 360 and the electrode 380. Due to the deformation of the piezoelectric body 370, the vibration plate 350 is deformed or vibrated, and the volume of the pressure chamber 312 changes due to the deformation of the vibration plate 350. Then, the change in pressure generated by the change in the volume of the pressure chamber 312 is applied to the ink stored in the pressure chamber 312, and thus the ink stored in the pressure chamber 312 is discharged from the nozzle 321 via the nozzle communication path 316. At this time, the discharge amount of the ink discharged from the nozzle 321 is a volume change amount of the pressure chamber 312.

Here, in the following description, when a voltage is applied between the electrode 360 and the electrode 380 in the piezoelectric element 60, a part where the piezoelectric distortion occurs in the piezoelectric body 370 will be referred to as an active section 410, and a part where the piezoelectric distortion does not occur in the piezoelectric body 370 will be referred to as an inactive section 415. That is, in the piezoelectric element 60, a part where the piezoelectric body 370 is interposed between the electrode 360 and the electrode 380 corresponds to the active section 410, and a part where the piezoelectric body 370 is not interposed between the electrode 360 and the electrode 380 corresponds to the inactive section 415. When the piezoelectric element 60 is driven, a part that is displaced in the direction along the Z axis will be referred to as a flexible portion, and a part that is not displaced in the direction along the Z axis will be referred to as a non-flexible portion. That is, in the piezoelectric element 60, a part that faces the pressure chamber 312 in the direction along the Z axis corresponds to the flexible portion, and the outer part of the pressure chamber 312 corresponds to the non-flexible portion. The active section 410 may be referred to as a proactive section, and the inactive section 415 may be referred to as a passive portion.

In general, one electrode of the active section 410 is configured as an independent individual electrode for each active section 410, and the other electrode is configured as a common electrode common to the plurality of active sections 410. In the present embodiment, the description is made in which the electrode 360 to which a signal output by the integrated circuit 421 is supplied is configured as an individual electrode, and the electrode 380 to which a signal having a reference potential propagating through the wiring substrate 420 is supplied is configured as a common electrode.

Specifically, the electrode 360 is provided on the +Z side with respect to the piezoelectric body 370, is separated for each pressure chamber 312, and configures an individual electrode that is independent for each active section 410. That is, the electrode 360 is individually provided for the plurality of pressure chambers 312. The electrode 360 is formed to have a width smaller than the width of the pressure chamber 312 in the direction along the Y axis. That is, the end portion of the electrode 360 is positioned on the inner side of the region facing the pressure chamber 312 in the direction along the Y axis.

An end portion **360*a* on the +X side and an end portion 360*b* on the −X side of the electrode 360 are respectively disposed on the outer side of the pressure chamber 312. For example, in the first pressure chamber array, as illustrated in FIG. 7, the end portion 360*a* of the electrode 360 is disposed further on the +X side than the end portion 312*a* on the +X side in the pressure chamber 312. The end portion 360*b* of the electrode 360 is disposed further on the −X side than the end portion 312*b* on the −X side in the pressure chamber 312**.

A material of the electrode 360 is not particularly limited, and, for example, metals such as platinum (Pt), iridium (Ir), gold (Au), and titanium (Ti), and conductive materials including conductive metal oxides such as indium tin oxide abbreviated to ITO may be used. Alternatively, a plurality of materials such as platinum (Pt), iridium (Ir), gold (Au), and titanium (Ti) may be stacked and formed. In the first embodiment, platinum (Pt) is used as the electrode 360.

As illustrated in FIG. 5, the piezoelectric body 370 is continuously provided in the direction along the Y axis with a length in the direction along the X axis as a predetermined length. That is, the piezoelectric body 370 has a predetermined thickness and is continuously provided along the direction in which the pressure chambers 312 are arranged side by side. A thickness of the piezoelectric body 370 is not particularly limited, and may be approximately 1000 nanometers to 4000 nanometers.

As illustrated in FIG. 7, the length of the piezoelectric body 370 in the direction along the X axis is larger than the length of the pressure chamber 312 in the direction along the X axis which is a longitudinal direction. Therefore, on both sides of the pressure chamber 312 in the direction along the X axis, the piezoelectric body 370 extends to the outer side of the pressure chamber 312. As described above, the piezoelectric body 370 extends to the outer side of the pressure chamber 312 in the direction along the X axis, and thus the strength of the vibration plate 350 is improved. Therefore, when the active section 410 is driven to displace the piezoelectric element 60, it is possible to reduce the concern that the cracks or the like occurs in the vibration plate 350 or the piezoelectric element 60.

For example, in the first pressure chamber array, as illustrated in FIG. 7, an end portion **370*a* of the piezoelectric body 370 on the +X side is positioned further on the +X side that is an outer side than the end portion 360*a* of the electrode 360. That is, the end portion 360***a* of the electrode 360 is covered with the piezoelectric body 370. On the other hand, the end portion 370*b* of the piezoelectric body 370 on the −X side is positioned further on the +X side which is an inner side than the end portion 360*b* of the electrode 360, and the end portion 360*b* of the electrode 360 is not covered with the piezoelectric body 370.

As illustrated in FIGS. 5 and 8, the piezoelectric body 370 is formed with a groove portion 371 that corresponds to each of the partition walls 311 and has a thickness smaller than that of the other regions. The groove portion 371 of the present embodiment is formed by completely removing the piezoelectric body 370 in the direction along the Z axis. That is, the fact that the piezoelectric body 370 has a part having a thickness smaller than the other regions includes a case where the piezoelectric body 370 is completely removed in the direction along the Z axis. It is needless to say that the piezoelectric body 370 may be formed thinner than the other parts on the bottom surface of the groove portion 371.

The length of the groove portion 371 in the direction along the Y axis, that is, the width of the groove portion 371 is the same as or larger than the width of the partition wall 311. In the present embodiment, the width of the groove portion 371 is larger than the width of the partition wall 311. The groove portion 371 is formed to have a rectangular shape in plan view from the −Z side. It is needless to say that the shape of the groove portion 371 in plan view from the −Z side is not limited to a rectangular shape, and may be a polygonal shape of pentagon or more, a circular shape, an elliptical shape, or the like.

By providing the groove portion 371 in the piezoelectric body 370, the rigidity of the part of the vibration plate 350 facing the end portion of the pressure chamber 312 in the direction along the Y axis, that is, a so-called arm portion of the vibration plate 350 is suppressed, and thus the piezoelectric element 60 can be better displaced.

Examples of the piezoelectric body 370 include a crystal film having a perovskite structure formed on the electrode 360 and made of a ferroelectric ceramic material exhibiting an electromechanical conversion action, that is, a so-called perovskite type crystal. As a material of the piezoelectric body 370, for example, a ferroelectric piezoelectric material such as lead zirconate titanate (PZT) or a material to which a metal oxide such as niobium oxide, nickel oxide, or magnesium oxide is added may be used. Specifically, lead titanate ($PbTiO_3$), lead zirconate titanate ($Pb(Zr,Ti)O_3$), lead zirconate ($PbZrO_3$), lead lanthanum titanate ($(Pb,La),TiO_3$), lead lanthanum zirconate titanate ($(Pb,La)(Zr,Ti)O_3$), lead magnesium niobate zirconate ($Pb(Zr,Ti)(Mg,Nb)O_3$), or the like may be used. In the present embodiment, lead zirconate titanate (PZT) is used as the piezoelectric body 370.

The material of the piezoelectric body 370 is not limited to a lead-based piezoelectric material containing lead, and a lead-free piezoelectric material containing no lead may also be used. Examples of the lead-free piezoelectric material include bismuth iron acid ($(BiFeO_3)$, abbreviated to "BFO"), barium titanate ($(BaTiO_3)$, abbreviated to "BT"), potassium sodium niobate ($(K,Na)(NbO_3)$, abbreviated to "KNN"), potassium sodium lithium niobate ($(K,Na,Li)(NbO_3)$), potassium sodium lithium tantalate niobate ($(K,Na,Li)(Nb,Ta)O_3$), bismuth potassium titanate ($(Bi_{1/2}K_{1/2})TiO_3$, abbreviated to "BKT"), bismuth sodium titanate ($(Bi_{1/2}Na_{1/2})TiO_3$, abbreviated to "BNT"), bismuth manganate ($BiMnO_3$, abbreviated to "BM"), a composite oxide containing bismuth, potassium, titanium, and iron and having a perovskite structure ($x[(Bi_xK_{1-x})TiO_3]$-$(1-x)[BiFeO_3]$, abbreviated to "BKT-BF"), a composite oxide containing bismuth, iron, barium, and titanium and having a perovskite structure ($(1-x)[BiFeO_3]$-$x[BaTiO_3]$, abbreviated to "BFO-BT"), and a material ($(1-x)[Bi(Fe_{1-y}M_y)O_3]$-$x[BaTiO_3]$, M being Mn, Co, or Cr), which is obtained by adding metals such as manganese, cobalt, and chromium to the composite oxide.

As illustrated in FIGS. 5, 7, and 8, the electrode 380 is provided on the −Z side which is the opposite side to the electrode 360 with respect to the piezoelectric body 370, and is configured as a common electrode common to the plurality of active sections 410. That is, the electrode 380 is provided in common to the plurality of pressure chambers 312. The electrode 380 is continuously provided in the direction along the Y axis with the length in the direction along the X axis as a predetermined length. The electrode 380 is also provided on the inner surface of the groove portion 371, that is, on the side surface of the groove portion 371 of the piezoelectric body 370, and on the insulator film 352 which is the bottom surface of the groove portion 371. Regarding the inside of the groove portion 371, the electrode 380 may be provided only at a part of the inner surface of the groove portion 371, or may not be provided over the entire surface of the inner surface of the groove portion 371.

For example, in the first pressure chamber array, as illustrated in FIG. 7, an end portion 380*a* of the electrode 380 on the +X side is disposed further on the +X side that is an outer side than the end portion 360*a* of the electrode 360 covered with the piezoelectric body 370. That is, the end portion 380*a* of the electrode 380 is positioned further on the +X side that is an outer side than end portion 312*a* of the pressure chamber 312, and further on the +X side that is an outer side than the end portion 360*a* of the electrode 360. In the present embodiment, the end portion 380*a* of the electrode 380 substantially coincides with the end portion 370*a* of the piezoelectric body 370 in the direction along the X axis. Accordingly, the end portion of the active section 410 on the +X side, that is, the boundary between the active section 410 and the inactive section 415 is defined by the end portion 360*a* of the electrode 360.

On the other hand, the end portion 380*b* of the electrode 380 on the −X side is disposed further on the −X side that is an outer side than the end portion 312*b* of the pressure chamber 312 on the −X side, and further on the +X side that is an inner side than the end portion 370*b* of the piezoelectric body 370. As described above, the end portion 370*b* of the piezoelectric body 370 is positioned further on the inner side that is the +X side than the end portion 360*b* of the electrode 360. Therefore, the end portion 380*b* of the electrode 380 is positioned on the piezoelectric body 370 further on the +X side than the end portion 360*b* of the electrode 360. Therefore, there is a part at which the surface of the piezoelectric body 370 is exposed on the −X side of the end portion 380*b* of the electrode 380.

As described above, the end portion 380*b* of the electrode 380 is disposed closer to the +X side than the end portion 370*b* of the piezoelectric body 370 and the end portion 360*b* of the electrode 360. Accordingly, the end portion of the active section 410 on the −X side, that is, the boundary between the active section 410 and the inactive section 415 is defined by the end portion 380*b* of the electrode 380.

A material of the electrode 380 is not particularly limited, but, similar to the electrode 360, for example, metals such as platinum (Pt), iridium (Ir), gold (Au), and titanium (Ti), and conductive materials including conductive metal oxides such as indium tin oxide abbreviated to ITO may be used. Alternatively, a plurality of materials such as platinum (Pt), iridium (Ir), gold (Au), and titanium (Ti) may be stacked and formed. In the present embodiment, iridium (Ir) is used as the electrode 380.

On the outer side of the end portion 380*b* of the electrode 380, that is, further on the −X side of the end portion 380*b* of the electrode 380, a wiring section 385 that is formed at the same layer as the electrode 380 but is electrically decoupled from the electrode 380 is provided. The wiring section 385 is formed from the upper part of the piezoelectric body 370 over the electrode 360 extending further to the −X side than the piezoelectric body 370 in a state where the wiring section 385 is spaced with an interval not to be in contact with the end portion 380*b* of the electrode 380. The wiring section 385 is provided independently for each of the active sections 410. That is, a plurality of wiring sections 385 are disposed at predetermined intervals in the direction along the Y axis. The wiring section 385 may be formed at a layer different from that of the electrode 380, but is preferably formed at the same layer as that of the electrode 380. As a result, the manufacturing process of the wiring section 385 can be simplified and the cost can be reduced.

For the electrode 360 and the electrode 380 configuring the piezoelectric element 60, the individual lead electrode 391 is electrically coupled to the electrode 360 and the common lead electrode 392 that is a driving common electrode is electrically coupled to the electrode 380. The flexible wiring substrate 420 is electrically coupled to the end portions of the individual lead electrode 391 and the common lead electrode 392 on the opposite side to the end portions coupled to the piezoelectric element 60. The control unit 10, the temperature information output circuit 26, and a plurality of wirings for coupling to a plurality of circuits (not illustrated) are formed on the wiring substrate 420. In the present embodiment, the wiring substrate 420 is configured with, for example, a flexible printed circuit (FPC). Any flexible substrate such as a flexible flat cable (FFC) may be used instead of the FPC.

In the present embodiment, the individual lead electrode 391 and the common lead electrode 392 extend to be exposed in the through-hole 332 formed on the protective substrate 330, and are electrically coupled to the wiring substrate 420 in the through-hole 332. In addition, the integrated circuit 421 that outputs a signal for driving the piezoelectric element 60 is mounted on the wiring substrate 420.

In the present embodiment, the individual lead electrode 391 and the common lead electrode 392 are formed at the same layer, but are formed to be electrically decoupled from each other. As a result, the manufacturing process can be simplified and the cost can be reduced compared with the case where the individual lead electrode 391 and the common lead electrode 392 are individually formed. It is needless to say that the individual lead electrode 391 and the common lead electrode 392 may be formed on different layers.

A material of the individual lead electrode 391 and the common lead electrode 392 is not particularly limited as long as the material is conductive. For example, gold (Au), copper (Cu), titanium (Ti), tungsten (W), nickel (Ni), chromium (Cr), platinum (Pt), aluminum (Al), and the like may be used. In the present embodiment, gold (Au) is used as the individual lead electrode 391 and the common lead electrode 392. The individual lead electrode 391 and the common lead electrode 392 may have an adhesion layer for improving the adhesion with the electrode 360, the electrode 380, and the vibration plate 350.

The individual lead electrode 391 is provided for each active section 410, that is, for each electrode 360. As illustrated in FIG. 7, for example, in the first pressure chamber array, the individual lead electrode 391 is coupled to the vicinity of the end portion 360*b* of the electrode 360 provided on the outer side of the piezoelectric body 370 via the wiring section 385, and is drawn out in the direction along the −X axis to the upper part of the pressure chamber substrate 310 and actually to the upper part of the vibration plate 350.

On the other hand, as illustrated in FIG. 5, for example, in the first pressure chamber array, the common lead electrode 392 is drawn out to the −X side from the upper part of the electrode 380 configuring the common electrode on the piezoelectric body 370 to the upper part of the vibration plate 350, at both end portions in the direction along the Y axis. The common lead electrode 392 has an extension section 392*a* and an extension section 392*b*. As illustrated in FIGS. 5 and 7, for example, in the first pressure chamber array, the extension section 392*a* extends in the direction along the Y axis in a region corresponding to the end portion 312*a* of the pressure chamber 312, and the extension section 392*b* extends in the direction along the Y axis to a region corresponding to the end portion 312*b* of the pressure chamber 312. The extension section 392*a* and the extension section 392*b* are continuously provided with respect to the plurality of active sections 410 in the direction along the Y axis.

The extension section 392*a* and the extension section 392*b* extend from the inner side of the pressure chamber 312 to the outer side of the pressure chamber 312 in the direction along the X axis. In the present embodiment, the active section 410 of the piezoelectric element 60 extends to the outer side of the pressure chamber 312 at both end portions of the pressure chamber 312 in the direction along the X axis, and the extension section 392*a* and the extension section 392*b* extend to the outer side of the pressure chamber 312 on the active section 410.

As illustrated in FIG. 7, the resistance wiring 401 is provided on the surface of the vibration plate 350 on the −Z side. The resistance wiring 401 measures the temperature of the pressure chamber 312 by using a characteristic that an electric resistance value changes depending on the temperature. As a material of the resistance wiring 401, for example, gold (Au), platinum (Pt), iridium (Ir), aluminum (Al), copper (Cu), titanium (Ti), tungsten (W), nickel (Ni), chromium (Cr) and the like may be used as long as the material of which an electric resistance value is temperature dependent is used. Among these, platinum (Pt) has a large change in resistance value due to temperature, and has high stability and accuracy. Furthermore, platinum (Pt) also has high linearity of a change in resistance value with respect to a temperature change. From this viewpoint, platinum (Pt) is preferably employed as the material of the resistance wiring 401. That is, the resistance wiring 401 is preferably configured to include platinum (Pt). In addition, in the present embodiment, the resistance wiring 401 is provided at the same layer as the electrode 360, and is stacked and formed on the surface of the vibration plate 350 on the −Z side to be electrically decoupled from the electrode 360. That is, the resistance wiring 401 is provided on the surface of the vibration plate 350 on the −Z side in the direction along the Z axis, and has a wiring including platinum (Pt).

As illustrated in FIG. 5, one end of the resistance wiring 401 is coupled to a measurement lead electrode 393*a*, and the other end of the resistance wiring 401 is coupled to a measurement lead electrode 393*b*. The measurement lead electrodes 393_a_ and 393_b_ are electrically coupled to the wiring substrate 420. As a result, a signal of a voltage value corresponding to the electric resistance value that changes with the temperature of the pressure chamber 312, which is the temperature of the pressure chamber 312 measured by the resistance wiring 401, is output from the print head 22. In the present embodiment, the resistance wiring 401 is covered with the piezoelectric body 370, and is positioned between the vibration plate 350 and the piezoelectric body 370 in the direction along the Z axis.

The resistance wiring 401 has a first pressure chamber array side meandering pattern positioned on the +X side in the direction along the X axis and a second pressure chamber array side meandering pattern positioned on the −X side in the direction along the X axis. The first pressure chamber array side meandering pattern is positioned to overlap the supply communication path 319 communicating with each pressure chamber 312 configuring the first pressure chamber array when viewed from the −Z side, and meanders in the direction along the Y axis. The second pressure chamber array side meandering pattern is positioned to overlap the supply communication path 319 communicating with each pressure chamber 312 configuring the second pressure chamber array when viewed from the −Z side, and meanders in the direction along the Y axis. That is, the resistance wiring 401 has the first pressure chamber array side meandering pattern corresponding to the first pressure chamber array formed by the plurality of pressure chambers 312 and the second pressure chamber array side meandering pattern corresponding to the second pressure chamber array formed by the plurality of pressure chambers 312.

As illustrated in FIGS. 6 and 7, a distance between the end portion of the pressure chamber 312 on the −Z side and the resistance wiring 401 in the direction along the z axis is shorter than a dimension of the pressure chamber 312 in the direction along the Z axis. For example, in the first pressure chamber array, the longest distance in the direction along X axis between the end portion 312_a_ of the pressure chamber 312 on the +X side and the resistance wiring 401 is shorter than the dimension of the pressure chamber 312 in the direction along the X axis. Therefore, the electric resistance value of the resistance wiring 401 is likely to change in response to a temperature change of the pressure chamber 312.

In the present embodiment, the measurement lead electrode 393 including the measurement lead electrode 393_a_ and the measurement lead electrode 393_b_ is formed at the same layer as the individual lead electrode 391 and the common lead electrode 392, but is electrically decoupled. As a result, the manufacturing process can be simplified and the cost can be reduced compared with the case where the measurement lead electrode 393 is individually formed with the individual lead electrode 391 and the common lead electrode 392. It is needless to say that the measurement lead electrode 393 may be formed on a layer different from the individual lead electrode 391 and the common lead electrode 392.

A material of the measurement lead electrode 393 is not particularly limited as long as the material is conductive. For example, gold (Au), copper (Cu), titanium (Ti), tungsten (W), nickel (Ni), chromium (Cr), platinum (Pt), and aluminum (Al) may be used. In the present embodiment, gold (Au) is used as the measurement lead electrode 393. Accordingly, the material of the measurement lead electrode 393 is the same as the material of the individual lead electrode 391 and the common lead electrode 392. The measurement lead electrode 393 may have an adhesion layer that improves adhesion to the resistance wiring 401 and the vibration plate 350.

As described above, in the present embodiment, the measurement lead electrode 393 extends to be exposed in the through-hole 332 formed on the protective substrate 330, and is electrically coupled to the wiring substrate 420 in the through-hole 332. As a result, the electric resistance value of the resistance wiring 401 that changes with the temperature of the pressure chamber 312 is output from the print head 22 via the wiring substrate 420.

That is, the print head 22 included in the head unit 20 according to the present embodiment includes: the piezoelectric element 60 which includes the electrode 360, the electrode 380, and the piezoelectric body 370, in which, in the direction along the Z axis in which the electrode 360, the electrode 380, and the piezoelectric body 370 are stacked, the piezoelectric body 370 is positioned between the electrode 360 and the electrode 380, and which is driven by receiving the drive signal COM; the vibration plate 350 that is positioned on the +Z side which is one side of the piezoelectric element 60 in the direction along the Z axis, and is deformed by the drive of the piezoelectric element 60; the pressure chamber substrate 310 that is positioned on the +Z side which is one side of the vibration plate 350 in the direction along the Z axis, and is provided with the pressure chamber 312 of which the volume changes due to the deformation of the vibration plate 350; the nozzle 321 that discharges the ink corresponding to the change in volume of the pressure chamber 312; and the resistance wiring 401 that is positioned on the −Z side which is the other side of the vibration plate 350 in the direction along the Z axis, and acquires the temperature corresponding to the temperature of the pressure chamber 312.

2. Functional Configuration of Liquid Discharge Apparatus

Functional Configuration of Liquid Discharge Apparatus

Figure 9:
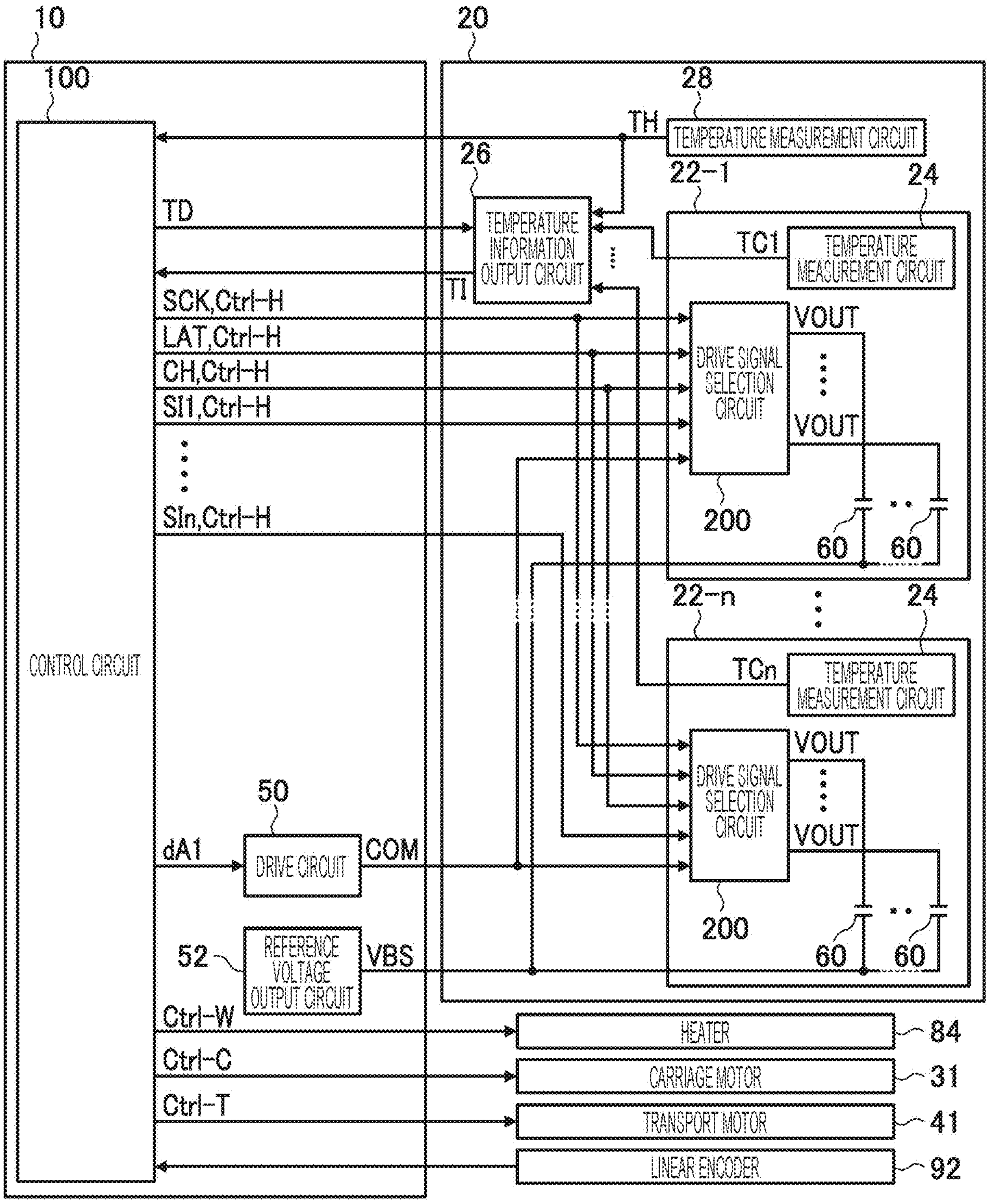
FIG. 9 is a view illustrating a functional configuration of the liquid discharge apparatus.

Next, a functional configuration of the liquid discharge apparatus 1 will be described. FIG. 9 is a view illustrating a functional configuration of the liquid discharge apparatus 1. As illustrated in FIG. 9, the liquid discharge apparatus 1 includes the control unit 10, the head unit 20, the carriage motor 31, the transport motor 41, the heater 84, and a linear encoder 92.

The control unit 10 includes a drive circuit 50, a reference voltage output circuit 52, and a control circuit 100. For example, the control circuit 100 includes a processing circuit such as a CPU and an FPGA and a memory circuit such as a semiconductor memory. An image information signal including image data or the like is input to the control circuit 100 from an external device such as a host computer that is communicatively coupled to the outside of the liquid discharge apparatus 1. The control circuit 100 generates various signals for controlling the liquid discharge apparatus 1 based on the input image information signal, and outputs the various signals to corresponding configurations.

As a specific example, in addition to the image information signal described above, a detection signal based on a scanning position of the above-described carriage 21 included in the head unit 20 is input from the linear encoder 92 to the control circuit 100. As a result, the control circuit 100 grasps a scanning position of the carriage 21 that is a scanning position of the head unit 20 including the print head 22. The control circuit 100 generates various signals according to the input image information signal and the grasped scanning position of the head unit 20, and outputs the signals to the corresponding configurations.

Specifically, the control circuit 100 generates the control signal Ctrl-C for controlling movement of the head unit 20 along the scanning axis according to the scanning position of the head unit 20, and outputs the control signal Ctrl-C to the carriage motor 31. As a result, the carriage motor 31 is operated, and movement of the head unit 20 mounted on the carriage 21 along the scanning axis and a scanning position thereof are controlled. Further, the control circuit 100 generates the control signal Ctrl-T for controlling the transport of the medium P, and outputs the control signal Ctrl-T to the transport motor 41. As a result, the transport motor 41 is operated, and movement of the medium P in the transport direction is controlled. The control signal Ctrl-C may be input to the carriage motor 31 after being signal-converted via a driver circuit (not illustrated), and the control signal Ctrl-T may be input to the transport motor 41 after being signal-converted via a driver circuit (not illustrated).

In addition, the control circuit 100 generates the control signal Ctrl-W for controlling the temperature of the heater 84 according to the type of ink to be discharged, the type of the medium P on which the ink lands, the operation state of the liquid discharge apparatus 1, and the like, and outputs the control signal Ctrl-W to the heater 84. As a result, the heater 84 is controlled at a desired temperature. At this time, the control circuit 100 may output a signal of the current value, the voltage value, or the current value defined in advance corresponding to the temperature of the heater 84 as the control signal Ctrl-W. In addition, the control signal Ctrl-W indicating the temperature of the heater 84 may be output to the heater control circuit (not illustrated) that controls the temperature of the heater 84.

The control circuit 100 generates print data signals SI1 to SIn, a change signal CH, a latch signal LAT, and a clock signal SCK as the control signals Ctrl-H for controlling the head unit 20 based on the image information signal input from the external device and the scanning position of the head unit 20, and outputs the these signals to the head unit 20. The control circuit 100 generates a temperature acquisition request signal TD for acquiring the temperature of the head unit 20 at a predetermined timing, and outputs the temperature acquisition request signal TD to the head unit 20. At this time, a temperature information signal TI including the temperature of the head unit 20 corresponding to the temperature acquisition request signal TD is input to the control circuit 100. The control circuit 100 grasps the state of the head unit 20 and corrects the control signals Ctrl-H, Ctrl-C, and Ctrl-T based on the input temperature information signal TI, and outputs the corrected signals to the corresponding components.

Further, the control circuit 100 outputs a reference drive signal dA, which is a digital signal, to the drive circuit 50. The drive circuit 50 generates the drive signal COM having a signal waveform defined by the reference drive signal dA1 as the drive signal COM, and outputs the drive signal COM to the head unit 20.

Specifically, the reference drive signal dA1 output by the control circuit 100 is input to the drive circuit 50. The drive circuit 50 performs digital/analog conversion of the input reference drive signal dA1, and then performs class D amplification on the converted analog signal to generate the drive signal COM and output the drive signal COM to the head unit 20. Here, the description is made on the assumption that the reference drive signal dA1 output by the control circuit 100 is a digital signal that defines a signal waveform of the drive signal COM, but the reference drive signal dA1 may be an analog signal as long as the signal waveform of the drive signal COM can be defined. Further, the drive circuit 50 may generate the drive signal COM by performing the class A amplification, the class B amplification, and the class AB amplification on the signal waveform defined by the reference drive signal dA1.

The reference voltage output circuit 52 generates a reference voltage signal VBS and outputs the reference voltage signal VBS to the head unit 20. The reference voltage signal VBS is a signal having a constant potential which is a reference for driving the piezoelectric element 60 and is supplied to the electrode 380 that is a common electrode. The reference voltage signal VBS may be, for example, a constant signal at a ground potential, or may be a constant DC voltage signal at a potential such as 5.5 V or 6 V.

The head unit 20 includes print heads 22-1 to **22-*n* as the plurality of print heads 22, the temperature information output circuit 26, and a temperature measurement circuit 28. In addition, each of the print heads 22-1 to 22-*n* includes a drive signal selection circuit 200, a temperature measurement circuit 24, and the plurality of piezoelectric elements 60**.

The print data signal SI1, the change signal CH, the latch signal LAT, the clock signal SCK, the drive signal COM, and the reference voltage signal VBS, which are output by the control circuit 100, are input to the print head 22-1. The clock signal SCK, the latch signal LAT, the change signal CH, the print data signal SI1, and the drive signal COM, which are input to the print head 22-1, are input to the drive signal selection circuit 200. The drive signal selection circuit 200 selects or deselects a signal waveform included in the drive signal COM, based on the input clock signal SCK, latch signal LAT, change signal CH, and print data signal SI1, to generate the drive signal VOUT corresponding to each of the plurality of piezoelectric elements 60. Then, the drive signal selection circuit 200 outputs the generated drive signal VOUT to each electrode 360 that is one end of each corresponding piezoelectric element 60 and is an individual electrode. The reference voltage signal VBS is commonly input to the electrode 380 that is the other end of the plurality of piezoelectric elements 60 and is a common electrode. Then, each of the plurality of piezoelectric elements 60 is displaced by the potential difference between the drive signal VOUT input to the electrode 360 and the reference voltage signal VBS input to the electrode 380. As a result, an amount of ink corresponding to the displacement of the piezoelectric element 60 is discharged from the corresponding nozzle 321 included in the print head 22-1. Here, at least a part of the drive signal selection circuit 200 included in the print head 22-1 is mounted on the wiring substrate 420 of the print head 22-1 as the integrated circuit 421 described above.

In addition, the temperature measurement circuit 24 included in the print head 22-1 measures the temperature of the print head 22-1. Then, the temperature measurement circuit 24 acquires the detected temperature of the print head 22-1 as head temperature information tc1 and outputs head temperature signal TC1 including the acquired head temperature information tc1 to the temperature information output circuit 26. Here, at least a part of the temperature measurement circuit 24 included in the print head 22-1 is provided in the print head 22-1 as the resistance wiring 401 described above. That is, the head temperature information tc1 indicating the temperature of the print head 22-1 output by the temperature measurement circuit 24 includes information of the voltage value generated according to the resistance value of the resistance wiring 401.

In addition, the print heads 22-2 to **22-*n* perform the same operation as the print head 22-1 except that the input signal and the output signal are different. Specifically, the clock signal SCK, the latch signal LAT, the change signal CH, a print data signal SIi, the drive signal COM, and the reference voltage signal VBS are input to the print head 22-*i* (i is any one of 2 to n). Then, the drive signal selection circuit 200 included in the print head 22-*i* selects or deselects a signal waveform of the drive signal COM based on the input clock signal SCK, latch signal LAT, change signal CH, and print data signal SIi to generate the drive signal VOUT corresponding to each of the plurality of piezoelectric elements 60, and output the generated drive signal VOUT to the electrode 360 of the corresponding piezoelectric element 60. In addition, the reference voltage signal VBS is commonly input to the electrodes 380 of the plurality of piezoelectric elements 60 included in the print head 22-*i*. Therefore, the plurality of piezoelectric elements 60 included in the print head 22-*i* are driven, and an amount of ink corresponding to the drive of the piezoelectric element 60 is discharged from the nozzle 321 included in the print head 22-*i*. In addition, the temperature measurement circuit 24 included in the print head 22-*i* acquires the temperature of the print head 22-*i* as the head temperature information tci, and the head temperature signal TCi including the acquired head temperature information tci is output to the temperature information output circuit 26. Here, at least a part of the drive signal selection circuit 200 included in the print head 22-*i* is mounted on the wiring substrate 420 of the print head 22-*i* as the integrated circuit 421 described above, and at least a part of the temperature measurement circuit 24 included in the print head 22-*i* is provided in the print head 22-*i* as the resistance wiring 401** described above.

Here, in the following description, the description will be made on the assumption that the clock signal SCK, the latch signal LAT, the change signal CH, and the print data signals SI as the print data signals SI1 to SIn, the drive signal COM, and the reference voltage signal VBS are input to the print head 22 when it is not necessary to distinguish the print heads 22-1 to **22-*n*. Then, the description will be made on the assumption that the temperature measurement circuit 24 of the print head 22 acquires the head temperature information tc as the head temperature information tc1 to tcn indicating the temperature of the print head 22, and the print head 22 outputs head temperature signal TC as the head temperature signals TC1** to TCn including the acquired head temperature information tc.

The temperature measurement circuit 28 measures the temperature of the head unit 20 including the print heads 22-1 to **22-*n*. Then, the temperature measurement circuit 28 generates a unit temperature signal TH including unit temperature information th indicating the measured temperature. The temperature measurement circuit 28 outputs the generated unit temperature signal TH to the temperature information output circuit 26 and the control circuit 100. The temperature measurement circuit 28 is configured to include a thermistor element or the like of which a resistance value changes in response to the temperature change of the head unit 20**.

The head temperature signals TC1 to TCn output by each of the print heads 22-1 to **22-*n*, the unit temperature signal TH output by the temperature measurement circuit 28, and the temperature acquisition request signal TD output by the control circuit 100 are input to the temperature information output circuit 26. The temperature information output circuit 26 amplifies and holds the input head temperature signals TC1 to TCn and amplifies and holds the unit temperature signal TH. The temperature information output circuit 26 calculates a correction function based on the held head temperature signals TC1** to TCn and the unit temperature signal TH.

Thereafter, the temperature information output circuit 26 acquires the head temperature information tc1 to tcn included in the input head temperature signals TC1 to TCn in response to the temperature acquisition request signal TD input from the control circuit 100, and corrects the temperatures defined by the acquired head temperature information tc1 to tcn by the calculated correction function. The temperature information output circuit 26 outputs the temperature information signal TI including the corrected signal to the control circuit 100. A configuration and a specific example of an operation of the temperature information output circuit 26 will be described later.

As described above, the liquid discharge apparatus 1 of the present embodiment includes: the control circuit 100 that outputs the control signal Ctrl-H including the clock signal SCK, the latch signal LAT, the change signal CH, and the print data signal SI; the drive circuit 50 that outputs the drive signal COM; and the head unit 20 that receives the control signal Ctrl-H and the drive signal COM and discharges ink, and the head unit 20 includes the print head 22 that discharges a liquid based on the drive signal VOUT corresponding to the drive signal COM, a temperature measurement circuit 28 that measures the temperature of the head unit 20 as the unit temperature information th and outputs the unit temperature signal TH including the unit temperature information th, and the temperature information output circuit 26 to which the unit temperature signal TH and the head temperature signal TC including the head temperature information tc corresponding to the temperature of the print head 22 are input, and which outputs the temperature information signal TI.

Signal Waveform of Drive Signal COM and Functional Configuration of Drive Signal Selection Circuit Next, the configuration and operation of the drive signal selection circuit 200 included in the print head 22 will be described. As described above, the drive signal selection circuit 200 included in the print head 22 selects or deselects the signal waveform included in the drive signal COM based on the clock signal SCK, the print data signal SI, the latch signal LAT, and the change signal CH to generate the drive signal VOUT and output the generated drive signal VOUT to the corresponding piezoelectric element 60. Here, in describing the configuration and operation of the drive signal selection circuit 200, an example of a waveform of the drive signal COM input to the drive signal selection circuit 200 will be first described.

Figure 10:
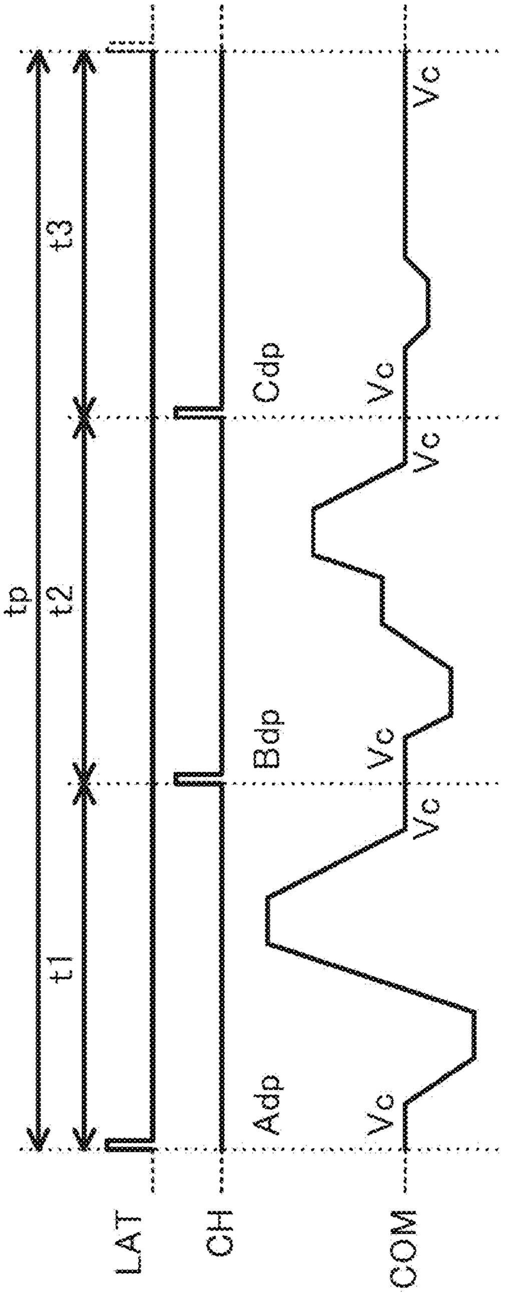
FIG. 10 is a view illustrating an example of a signal waveform of a drive signal COM.

FIG. 10 is a graph illustrating an example of the signal waveform of the drive signal COM. As illustrated in FIG. 10, the drive signal COM has a trapezoidal waveform Adp disposed in the period t1 after the latch signal LAT rises until the change signal CH rises, a trapezoidal waveform Bdp disposed in the period t2 after the change signal CH rises until the next change signal CH rises, and a trapezoidal waveform Cdp disposed in the period t3 after the change signal CH rises until the latch signal LAT rises. The trapezoidal waveform Adp is a signal waveform that drives the piezoelectric element 60 to discharge a predetermined amount of ink, the trapezoidal waveform Bdp is a signal waveform that drives the piezoelectric element 60 such that a smaller amount of ink than a predetermined amount is discharged, and the trapezoidal waveform Cdp is a signal waveform that drives the piezoelectric element 60 to such an extent that ink is not discharged. Here, the trapezoidal waveform Cdp is a signal waveform for reducing the concern that the ink viscosity in the vicinity of the nozzle opening portion increases due to the piezoelectric element 60 vibrating ink viscosity in the vicinity of the corresponding nozzle opening portion when the trapezoidal waveform Cdp is supplied to the piezoelectric element 60.

Further, both the voltage values at each of the start timing and the end timing of the trapezoidal waveforms Adp, Bdp, and Cdp are voltages Vc which are common signal waveforms. In other words, each of the trapezoidal waveforms Adp, Bdp, and Cdp starts at the voltage Vc and ends at the voltage Vc.

In the following description, when the trapezoidal waveform Adp is supplied to the piezoelectric element 60, the amount of the predetermined amount of ink to be discharged may be referred to as a medium amount, and when the trapezoidal waveform Bdp is supplied to the piezoelectric element 60, the amount of ink smaller than the predetermined amount to be discharged may be referred to as a small amount. Further, when the trapezoidal waveform Cdp is supplied to the piezoelectric element 60, the operation for vibrating the ink in the vicinity of the nozzle opening portion corresponding to the piezoelectric element 60 to prevent the ink viscosity from increasing may be referred to as micro-vibration. The signal waveform of the drive signal COM illustrated in FIG. 10 is an example, and the present disclosure is not limited to this. As the signal waveform of the drive signal COM, various waveform combinations may be used depending on the property of the discharged ink, the material of the medium P on which the ink lands, and the like.

The drive signal selection circuit 200 selects or deselects the trapezoidal waveforms Adp, Bdp, and Cdp included in the drive signal COM in the cycle tp including the periods t1, t2, and t3. As a result, the drive signal selection circuit 200 controls the discharge amount of the ink discharged from each of the plurality of nozzles 321 in the cycle tp. That is, the drive signal selection circuit 200 controls the dot size formed on the medium P in the cycle tp. In the cycle tp including the periods t1, t2, and t3, dots of a predetermined size are formed on the medium P. The cycle tp in which the dots of the predetermined size are formed corresponds to the dot formation cycle.

Figure 11:
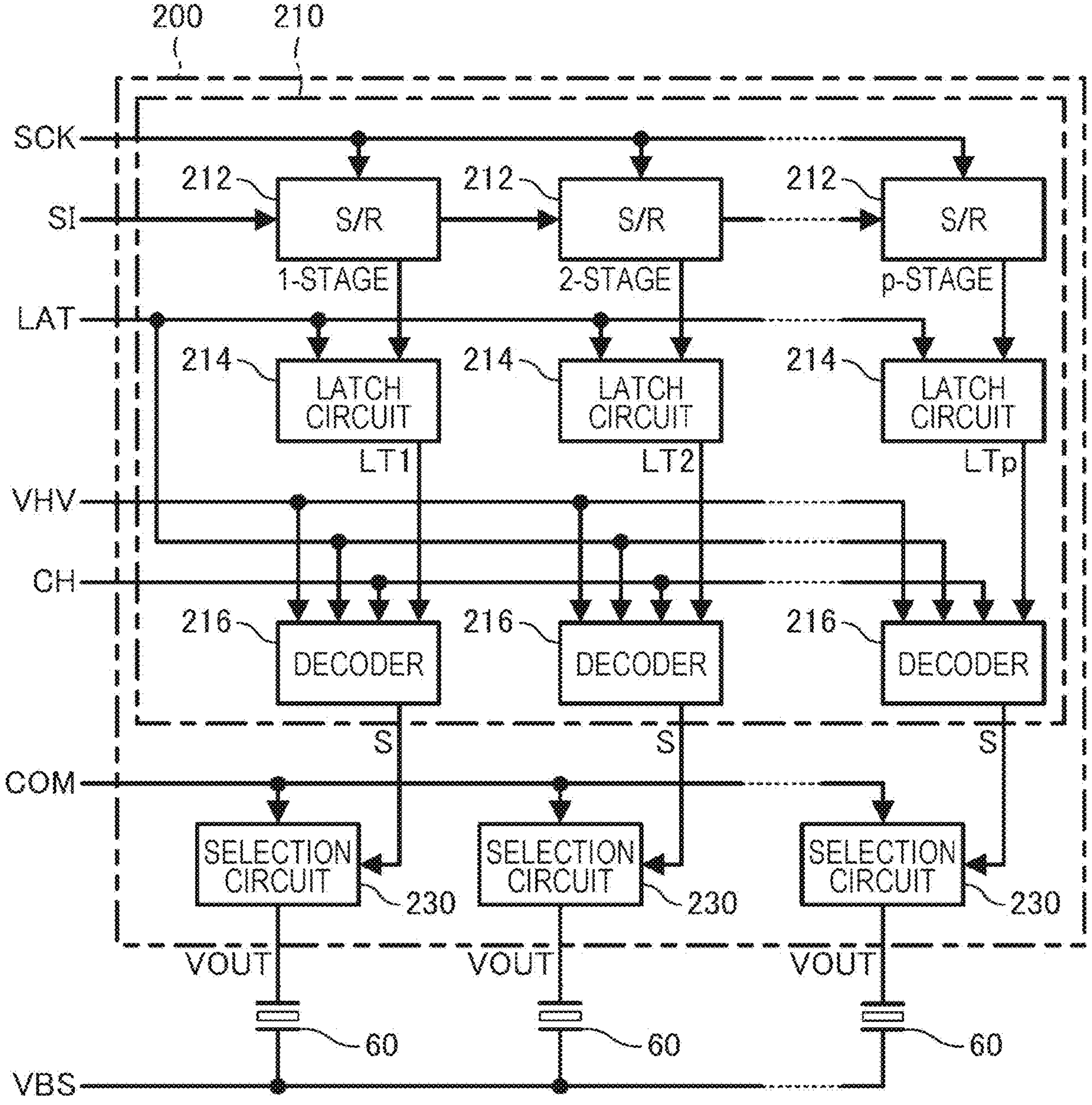
FIG. 11 is a view illustrating a configuration of a drive signal selection circuit.

Next, the configuration and operation of the drive signal selection circuit 200 that generates the drive signal VOUT by selecting or deselecting the signal waveform included in the drive signal COM will be described. FIG. 11 is a view illustrating the configuration of the drive signal selection circuit 200. As illustrated in FIG. 11, the drive signal selection circuit 200 includes a selection control circuit 210 and a plurality of selection circuits 230 that are the same in number as the plurality of piezoelectric elements 60. Note that, in the description below, the description will be made on the assumption that the print head 22 has p piezoelectric elements 60. That is, the drive signal selection circuit 200 includes p selection circuits 230.

The clock signal SCK, the print data signal SI, the latch signal LAT, and the change signal CH are input to the selection control circuit 210. In addition, in the selection control circuit 210, sets of a shift register (S/R) 212, a latch circuit 214, and a decoder 216 are provided corresponding to each of the p piezoelectric elements 60. That is, the drive signal selection circuit 200 includes p shift registers 212, p latch circuits 214, and p decoders 216.

The print data signal SI is input to the selection control circuit 210 in synchronization with the clock signal SCK. In addition, the print data signals SI includes 2-bit print data [SIH, SIL] for selecting one of "large dot LD", "medium dot MD", "small dot SD", and "non-recording ND", serially corresponding to each of the p piezoelectric elements 60. The print data [SIH, SIL] included in the print data signal SI is held in the p shift registers 212 that corresponds to the p piezoelectric elements 60. Specifically, p shift registers 212 corresponding to the piezoelectric element 60 are vertically coupled to each other, and the serially input print data signal SI is sequentially transferred to the subsequent shift register 212 according to the clock signal SCK. When the print data [SIH, SIL] is held in the corresponding shift register 212, the clock signal SCK is stopped. Accordingly, the print data [SIH, SIL] included in the print data signal SI is held in the corresponding shift register 212. In FIG. 11, in order to distinguish p shift registers 212 from each other, the shift registers 212 are denoted as 1-stage, 2-stage, . . . , and p-stage in order from the upstream to which the print data signal SI is input.

Figures 12, 13:
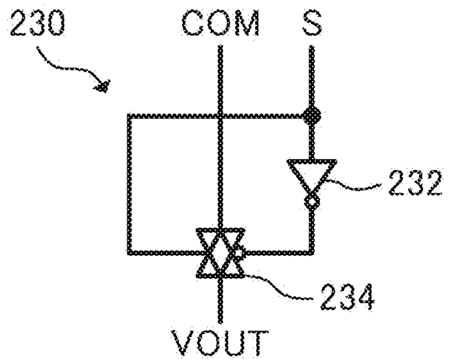
FIG. 12 is a table illustrating an example of decoding contents in a decoder.
FIG. 13 is a view illustrating a configuration of a selection circuit.

Each of the p latch circuits 214 simultaneously latches the print data [SIH, SIL] held in the corresponding shift register 212 at the rise of the latch signal LAT. In addition, the print data [SIH, SIL] latched by the latch circuit 214 is input to the corresponding decoder 216. FIG. 12 is a table illustrating an example of the decoding contents in the decoder 216. In each of the periods t1, t2, and t3, the decoder 216 outputs a selection signal S at a logic level defined by the input print data [SIH, SIL]. For example, when the print data [SIH, SIL]=[1, 0] is input to the decoder 216, the decoder 216 outputs the logic level of the selection signal S as H, L, and L levels in the periods t1, t2, and t3.

The selection signal S output by the decoder 216 is input to the selection circuit 230. The selection circuit 230 is provided corresponding to each of p piezoelectric elements 60. In other words, the drive signal selection circuit 200 has p selection circuits 230 that are the same in number as the p piezoelectric elements 60. FIG. 13 is a view illustrating the configuration of the selection circuit 230. As illustrated in FIG. 13, the selection circuit 230 includes an inverter 232 which is NOT circuit and a transfer gate 234.

The selection signal S is input to a positive control end which is not marked with a circle in the transfer gate 234, and is also input to the negative control end which is marked with a circle in the transfer gate 234 after the logic level is inverted by the inverter 232. In addition, the drive signal COM is supplied to the input end of the transfer gate 234. When the high level selection signal S is input, the transfer gate 234 is conductive between the input end and the output end, and when the low level selection signal S is input, the transfer gate 234 is non-conductive between the input end and the output end. That is, the transfer gate 234 outputs the signal waveform included in the drive signal COM from the output end when the logic level of the selection signal S is the high level, and does not output the signal waveform included in the drive signal COM from the output end when the logic level of the selection signal S is the low level. In addition, the drive signal selection circuit 200 outputs the signal output to the output end of the transfer gate 234 included in the selection circuit 230 as the drive signal VOUT.

Figure 14:
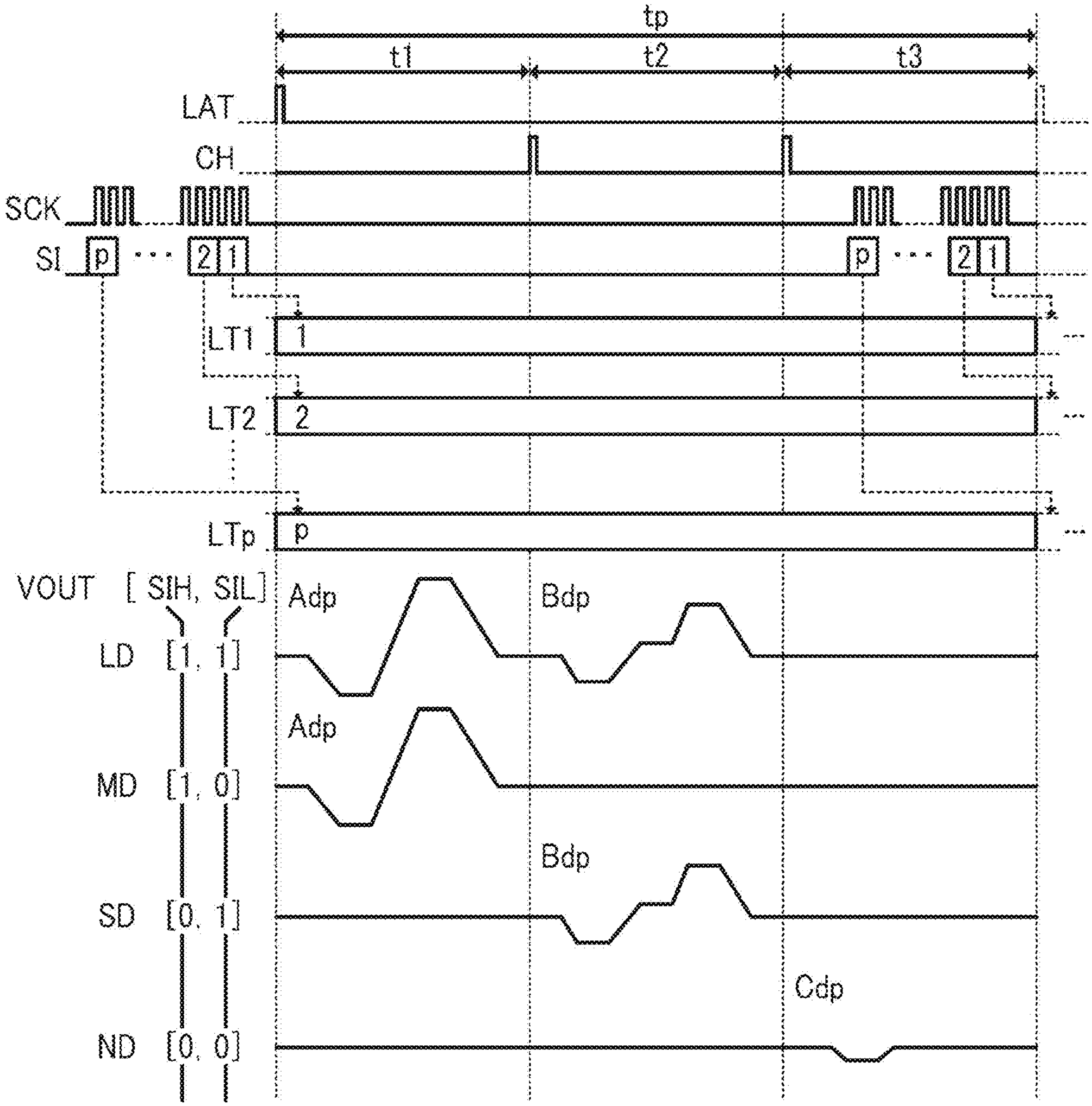
FIG. 14 is a diagram for describing an operation of the drive signal selection circuit.

Here, the operation of the drive signal selection circuit 200 will be described with reference to FIG. 14. FIG. 14 is a diagram for describing the operation of the drive signal selection circuit 200. The print data signal SI is input to the selection control circuit 210 as a serial signal synchronized with the clock signal SCK. In addition, the print data signals SI are sequentially transferred in the p shift registers 212 that correspond to the p piezoelectric elements 60 in synchronization with the clock signal SCK. Then, when the input of the clock signal SCK is stopped, the print data [SIH, SIL] that corresponds to each of the p piezoelectric elements 60 is held in the shift registers 212. The print data signal SI is input in order corresponding to the p-stage, . . . , 2-stage, and 1-stage piezoelectric elements 60 of the shift register 212.

When the latch signal LAT rises, each of the latch circuits 214 simultaneously latches the print data [SIH, SIL] held in the shift register 212. LT1, LT2, . . . , and LTp illustrated in FIG. 14 indicate the print data [SIH, SIL] latched by the latch circuits 214 that correspond to the 1-stage, 2-stage, . . . , and p-stage shift registers 212.

The decoder 216 outputs the logic levels of the selection signal S in each of the periods t1, t2, and t3 with the contents illustrated in FIG. 12, according to the size of the dot defined by the latched print data [SIH, SIL]. The selection circuit 230 selects or deselects the signal waveforms included in the drive signal COM according to the logic levels of the selection signal S output by the decoder 216, thereby generating the drive signal VOUT.

Specifically, when the print data [SIH, SIL]=[1, 1] is input to the decoder 216, the decoder 216 sets the logic level of the selection signal S to H, H, and L levels in the periods t1, t2, and t3. Accordingly, the selection circuit 230 selects the trapezoidal waveform Adp in the period t1, selects the trapezoidal waveform Bdp in the period t2, and does not select the trapezoidal waveform Cdp in the period t3. As a result, the drive signal selection circuit 200 outputs the drive signal VOUT corresponding to the “large dot LD”.

When the drive signal VOUT corresponding to the “large dot LD” is supplied to the piezoelectric element 60, a medium amount of ink is discharged in the period t1, a small amount of ink is discharged in the period t2, and the ink is not discharged in the period t3. Then, the medium amount of discharged ink and a small amount of the discharged ink land on the medium P and are combined to form the “large dot LD” on the medium P.

In addition, when the print data [SIH, SIL]=[1, 0] is input to the decoder 216, the decoder 216 sets the logic level of the selection signal S to the H, L, and L levels in the periods t1, t2, and t3. Accordingly, the selection circuit 230 selects the trapezoidal waveform Adp in the period t1, does not select the trapezoidal waveform Bdp in the period t2, and does not select the trapezoidal waveform Cdp in the period t3. As a result, the drive signal selection circuit 200 outputs the drive signal VOUT that corresponds to the “medium dot MD”.

When the drive signal VOUT corresponding to the “medium dot MD” is supplied to the piezoelectric element 60, a medium amount of ink is discharged in the period t1, ink is not discharged in the period t2, and ink is not discharged in the period t3. Then, a medium amount of the discharged ink lands on the medium P, and accordingly, the “medium dot MD” is formed on the medium P.

In addition, when the print data [SIH, SIL]=[0, 1] is input to the decoder 216, the decoder 216 sets the logic level of the selection signal S to the L, H, and L levels in the periods t1, t2, and t3. Accordingly, the selection circuit 230 does not select the trapezoidal waveform Adp in the period t1, selects the trapezoidal waveform Bdp in the period t2, and does not select the trapezoidal waveform Cdp in the period t3. As a result, the drive signal selection circuit 200 outputs the drive signal VOUT that corresponds to the “small dot SD”.

When the drive signal VOUT corresponding to the “small dot SD” is supplied to the piezoelectric element 60, the ink is not discharged in the period t1, a small amount of ink is discharged in the period t2, and the ink is not discharged in the period t3. Then, a small amount of the discharged ink lands on the medium P to form the “small dot SD” on the medium P.

In addition, when the print data [SIH, SIL]=[0, 0] is input to the decoder 216, the decoder 216 sets the logic level of the selection signal S to the L, L, and H levels in the periods t1, t2, and t3. Accordingly, the selection circuit 230 does not select the trapezoidal waveform Adp in the period t1, does not select the trapezoidal waveform Bdp in the period t2, and selects the trapezoidal waveform Cdp in the period t3. As a result, the drive signal selection circuit 200 outputs the drive signal VOUT corresponding to the “non-recording ND”.

When the drive signal VOUT corresponding to the “non-recording ND” is supplied to the piezoelectric element 60, the ink is not discharged in the period t1, the ink is not discharged in the period t2, and the ink is not discharged in the period t3. Therefore, the “non-recording ND” in which dots are not formed on the medium P is achieved. At this time, the drive signal VOUT including the trapezoidal waveform Cdp is input to the corresponding piezoelectric element 60. Therefore, the micro-vibration is executed. As a result, the concern that the ink viscosity increases in the vicinity of the opening portion of the corresponding nozzle 321 is reduced.

As described above, the drive signal selection circuit 200 generates the drive signal VOUT by selecting or deselecting the signal waveform of the drive signal COM output by the drive circuit 50, and outputs the generated drive signal VOUT to the corresponding piezoelectric element 60. Therefore, the drive signal VOUT includes any of the trapezoidal waveforms Adp, Bdp, and Cdp included in the drive signal COM output by the drive circuit 50. In this case, the print head 22 that discharges ink based on the drive signal VOUT can be considered to discharge ink based on the drive signal COM.

Figure 15:
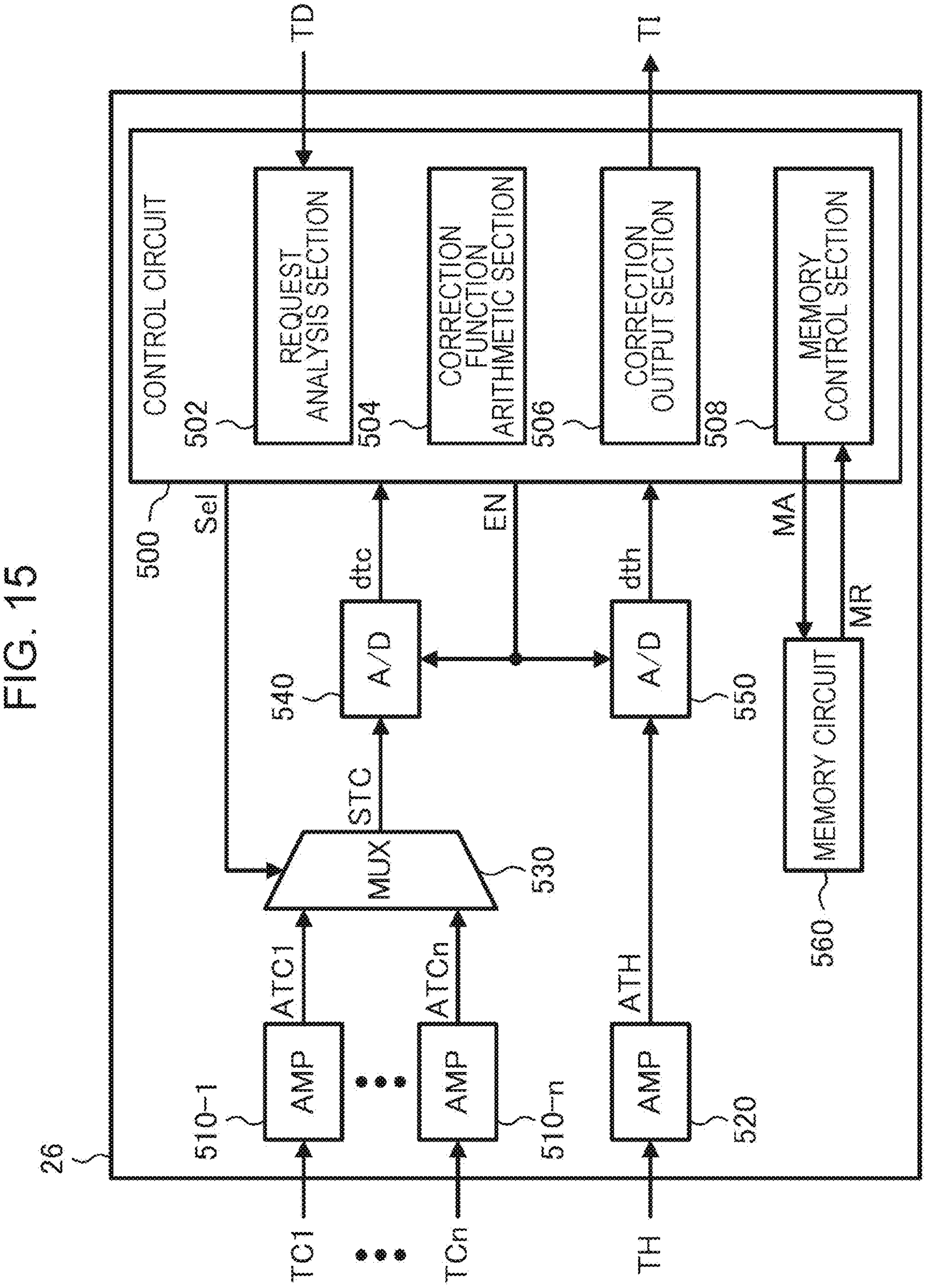
FIG. 15 is a view illustrating a functional configuration of a temperature information output circuit.

Functional Configuration and Operation of Temperature Information Output Circuit Next, a functional configuration of the temperature information output circuit 26 included in the head unit 20 will be described. FIG. 15 is a view illustrating a functional configuration of the temperature information output circuit 26. The temperature information output circuit 26 generates the temperature information signal TI corresponding to the head temperature signals TC1 to TCn including each of the head temperature information tc1 to tcn input from the print heads 22-1 to **22-*n* and the unit temperature signal TH including the unit temperature information th input from the temperature measurement circuit 28 based on the temperature acquisition request signal TD input from the control circuit 100, and outputs the generated temperature information signal TI to the control circuit 100**.

As illustrated in FIG. 15, the temperature information output circuit 26 includes a control circuit 500, amplifier circuits 510-1 to **510-*n* and 520, a multiplexer 530, an AD converter circuit 540 and 550, and a memory circuit 560**.

Each of the corresponding head temperature signals TC1 to TCn is input to each of the amplifier circuits 510-1 to **510-*n*. Then, each of the amplifier circuits 510-1 to 510-*n* generates head amplification temperature signals ATC1 to ATCn by amplifying the input head temperature signals TC1 to TCn, and outputs the generated head amplification temperature signals ATC1** to ATCn.

Specifically, the head temperature signal TC1 output from the print head 22-1 is input to the amplifier circuit 510-1. The amplifier circuit 510-1 amplifies the input head temperature signal TC1 and outputs the amplified head temperature signal TC1 as the head amplification temperature signal ATC1. In addition, the head temperature signal TCi output by the print head 22-*i* is input to the amplifier circuit 510-*i* (i is any one of 1 to n). Then, the amplifier circuit 510-*i* amplifies the input head temperature signal TCi and outputs the amplified head temperature signal TCi as a head amplification temperature signal ATCi.

The head amplification temperature signals ATC1 to ATCn output from each of the amplifier circuits 510-1 to 510-*n* are input to the multiplexer 530. In addition, the select signal Sel output by the control circuit 500 is input to the multiplexer 530. The multiplexer 530 selects one of the head amplification temperature signals ATC1 to ATCn input from each of the amplifier circuits 510-1 to 510-*n* according to the input select signal Sel, and outputs the selected head amplification temperature signals ATC1 to ATCn as a selection temperature signal STC.

The selection temperature signal STC output by the multiplexer 530 and an enable signal EN output by the control circuit 500 are input to the AD converter circuit 540. The AD converter circuit 540 converts the selection temperature signal STC input in a period in which the enable signal EN input from the control circuit 500 is valid into a digital signal, and outputs the digital signal to the control circuit 500. That is, the AD converter circuit 540 generates a digital signal corresponding to the head temperature information tc included in the head temperature signal TC selected by the multiplexer 530 in the period in which the enable signal EN is valid among the head temperature signals TC1 to TCn input to the temperature information output circuit 26, which is a digital signal including information corresponding to the temperature of the print head 22 corresponding to the head temperature signal TC selected by the multiplexer 530 in a period in which the enable signal EN is valid, and outputs the generated digital signal to the control circuit 500. In the following description, the digital signal output by the AD converter circuit 540 is referred to as digital temperature information dtc.

The unit temperature signal TH is input to the amplifier circuit 520. The amplifier circuit 520 amplifies the input unit temperature signal TH and outputs the amplified unit temperature signal TH as a unit amplification temperature signal ATH.

The unit amplification temperature signal ATH output by the amplifier circuit 520 and the enable signal EN output by the control circuit 500 are input to the AD converter circuit 550. The AD converter circuit 550 converts the unit amplification temperature signal ATH input in a period in which the enable signal EN input from the control circuit 500 is valid into a digital signal, and outputs the digital signal to the control circuit 500. That is, the AD converter circuit 540 generates a digital signal corresponding to the unit temperature information th included in the unit temperature signal TH input in the period in which the enable signal EN is enabled, which is a digital signal including information corresponding to temperature of the head unit 20 in the period in which the enable signal EN is valid, and outputs the generated digital signal to the control circuit 500. In the following description, the digital signal output by the AD converter circuit 550 may be referred to as digital temperature information dth.

The control circuit 500 includes a request analysis section 502, a correction function arithmetic section 504, a correction output section 506, and a memory control section 508. In addition, the control circuit 500 outputs the select signal Sel and the enable signal EN according to the input temperature acquisition request signal TD, generates the temperature information signal TI based on the digital temperature information dtc and dth input according to the output of the select signal Sel and the enable signal EN, and outputs the generated temperature information signal TI.

Specifically, the request analysis section 502 analyzes the temperature acquisition request signal TD input to the control circuit 500. Then, the request analysis section 502 outputs the select signal Sel and the enable signal EN according to the analysis result.

The correction function arithmetic section 504 calculates a correction function for correcting a signal corresponding to the temperatures of the print heads 22-1 to 22-*n* output as the temperature information signal TI based on the input digital temperature information dtc and dth.

The correction output section 506 corrects the signal corresponding to the temperature of the print heads 22-1 to 22-*n* by using the correction function calculated by the correction function arithmetic section 504, and outputs the corrected signal as the temperature information signal TI.

The memory control section 508 generates a memory control signal MA for accessing the memory circuit 560, outputs the generated memory control signal MA to the memory circuit 560, and acquires a memory reading signal MR corresponding to the memory control signal MA. The memory control section 508 generates, for example, the memory control signal MA for storing the input digital temperature information dtc and dth or the calculated correction function in the memory circuit 560, and outputs the generated memory control signal MA to the memory circuit 560. As a result, the digital temperature information dtc and dth and the correction function are stored in a predetermined storage area of the memory circuit 560. In addition, the memory control section 508 generates the memory control signal MA for reading information stored in the memory circuit 560 and outputs the generated memory control signal MA to the memory circuit 560. As a result, the memory reading signal MR including information read from the memory circuit 560 is input.

A method of generating a correction function in the temperature information output circuit 26 configured as described above and a specific example of correction using the correction function will be described.

Figure 16:
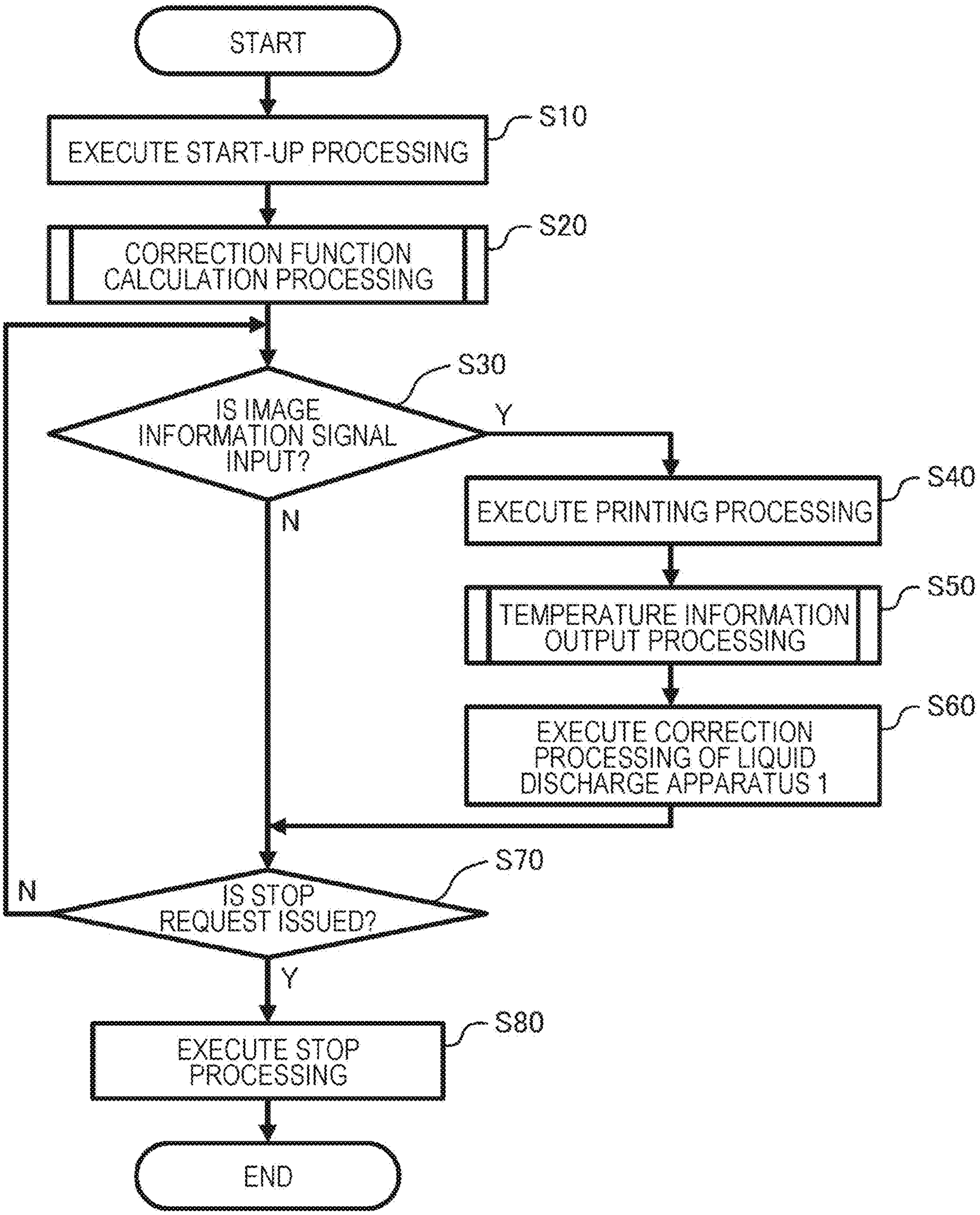
FIG. 16 is a diagram for describing an operation of the temperature information output circuit.

FIG. 16 is a diagram for describing an operation of the temperature information output circuit 26. As illustrated in FIG. 16, when the liquid discharge apparatus 1 is started up, the control circuit 100 executes a start-up processing (step S10). Here, the start-up processing of the liquid discharge apparatus 1 is, for example, processing executed by supplying a power supply voltage to the liquid discharge apparatus 1 or by a user pressing a switch or the like of the liquid discharge apparatus 1 includes the reading of information stored in a memory circuit (not illustrated).

Then, the temperature information output circuit 26 included in the head unit 20 of the liquid discharge apparatus 1 executes correction function calculation processing of calculating the correction function corresponding to each of the print heads 22-1 to 22-*n* after the start of the start-up processing of the liquid discharge apparatus 1 (step S20).

Specifically, as the correction function calculation processing, the control circuit 100 outputs the control signal Ctrl-W for controlling the temperature of the heat generation unit 80 including the heater 84 to the first temperature, and the temperature information output circuit 26 acquires and stores the head temperature information tc1 to tcn included in each of the head temperature signals TC1 to TCn and the unit temperature information th included in the unit temperature signal TH. After this, the control circuit 100 outputs the control signal Ctrl-W for controlling the temperature of the heat generation unit 80 including the heater 84 to the second temperature different from the first temperature, and the temperature information output circuit 26 acquires and stores the head temperature information tc1 to tcn included in each of the head temperature signals TC1 to TCn and the unit temperature information th included in the unit temperature signal TH.

That is, the temperature information output circuit 26 acquires and holds the head temperature information tc1 to tcn included in each of the head temperature signals TC1 to TCn and the unit temperature information th included in the unit temperature signal TH, at least at two temperatures of a case where the temperature of the heater 84 of the heat generation unit 80 is the first temperature and a case where the temperature of the heater 84 of the heat generation unit 80 is the second temperature. In addition, the temperature information output circuit 26 calculates the correction function by using the head temperature information tc1 to tcn and the unit temperature information th for the case of the stored first temperature and the head temperature information tc1 to tcn and the unit temperature information th for the case of the second temperature.

Such correction function calculation processing may be executed by inputting the temperature acquisition request signal TD output by the control circuit 100 to the temperature information output circuit 26, and after the control circuit 100 starts the start-up processing, the correction function calculation processing may be executed when a predetermined time elapsed. The first temperature or the second temperature may be the temperature at which the heater 84 of the heat generation unit 80 is in an OFF state, and may be the environmental temperature of the periphery where the liquid discharge apparatus 1 is installed. The details of the correction function calculation processing illustrated in step S20 will be described later.

After the correction function calculation processing is completed, the control circuit 100 determines whether or not an image information signal is input to the liquid discharge apparatus 1 (step S30). When the control circuit 100 determines that the image information signal is not input to the liquid discharge apparatus 1 (N in step S30), the control circuit 100 determines whether or not a stop request for stopping the operation of the liquid discharge apparatus 1 is issued (step S70). Here, the stoppage of the operation of the liquid discharge apparatus 1 includes, in addition to a state where the supply of the power supply voltage to the liquid discharge apparatus 1 is stopped, a so-called sleep state where the liquid discharge apparatus 1 stands by with reduced power consumption, and the like. The stop request for stopping the operation of the liquid discharge apparatus 1 may be, for example, a request issued when the user presses a corresponding switch to stop the operation of the liquid discharge apparatus 1, a request issued by the stoppage of the supply of the power supply voltage to the liquid discharge apparatus 1, or the like.

When the control circuit 100 determines that the stop request is not issued in the liquid discharge apparatus 1 (N in step S70), the control circuit 100 again determines whether or not an image information signal is input to the liquid discharge apparatus 1 (step S30). That is, the liquid discharge apparatus 1 stands by until the image information signal is input or until the stop request is made.

On the other hand, when the control circuit 100 determines that the image information signal is input to the liquid discharge apparatus 1 (Y in step S30), the control circuit 100 executes printing processing of forming an image based on the input image information signal on the medium P (step S40). The printing processing is processing in which the drive circuit 50 outputs the drive signal COM to the head unit 20 based on the reference drive signal dA1 output by the control circuit 100, and the control circuit 100 outputs the print data signal SI, the latch signal LAT, and the change signal CH to the head unit 20 such that the drive signal selection circuit 200 included in each of the print heads 22-1 to **22-*n* included in the head unit 20 generates the drive signal VOUT, and a predetermined amount of ink is discharged at a predetermined timing from each of the print heads 22-1 to 22-*n***.

In the period in which the control circuit 100 executes the printing processing, the temperature information output circuit 26 executes the temperature information output processing of outputting the temperature information signal TI indicating the temperature of each of the print heads 22-1 to **22-*n* in response to the temperature acquisition request signal TD (step S50). Specifically, the temperature information output circuit 26 acquires the head temperature information tc of the print head 22** designated by the input temperature acquisition request signal TD. In addition, the acquired head temperature information tc is corrected by using the correction function calculated in the correction function calculation processing, and a corrected signal is output as the temperature information signal TI. The details of the temperature information acquisition processing will be described later.

Then, the control circuit 100 executes correction processing of the liquid discharge apparatus 1 based on the temperature information signal TI input from the temperature information output circuit 26 (step S60). Here, the correction processing of the liquid discharge apparatus 1 includes, for example, correction of the control signals Ctrl-H, Ctrl-C, and Ctrl-T output by the control circuit 100. As a result, each configuration of the liquid discharge apparatus 1 can operate according to the temperatures of the print heads 22-1 to **22-*n*, which are the temperatures of the ink stored in each of the print heads 22-1 to 22-*n*. As a result, the discharge accuracy of the ink from each of the print heads 22-1 to 22-*n*** and the landing accuracy of the discharged ink on the medium P are improved, and the image quality formed on the medium P is improved.

After the correction processing of the liquid discharge apparatus 1 is completed, the control circuit 100 determines whether or not the stop request for stopping the operation of the liquid discharge apparatus 1 is issued (step S70), and when the stop request is not issued in the liquid discharge apparatus 1 (N in step S70), the control circuit 100 determines whether or not an image information signal is input to the liquid discharge apparatus 1 (step S30). On the other hand, when the stop request is issued for the liquid discharge apparatus 1 (Y in step S70), the control circuit 100 executes stop processing of the liquid discharge apparatus 1 (step S80), and then the liquid discharge apparatus 1 stops the operation.

As described above, in the liquid discharge apparatus 1 of the present embodiment, in the correction function calculation processing, the temperature information output circuit 26 calculates the correction function based on the unit temperature information th, which is input when the heat generation unit 80 generates heat at a predetermined temperature, and the head temperature information tc. In addition, the temperature information output circuit 26 outputs the temperature information signal TI corrected by using the calculated correction function. In other words, the temperature information output circuit 26 corrects the head temperature information tc output as the temperature information signal TI based on the unit temperature information th and the head temperature information tc input when the heat generation unit 80 generates heat at least at one of the first temperature and the second temperature.

Figure 17:
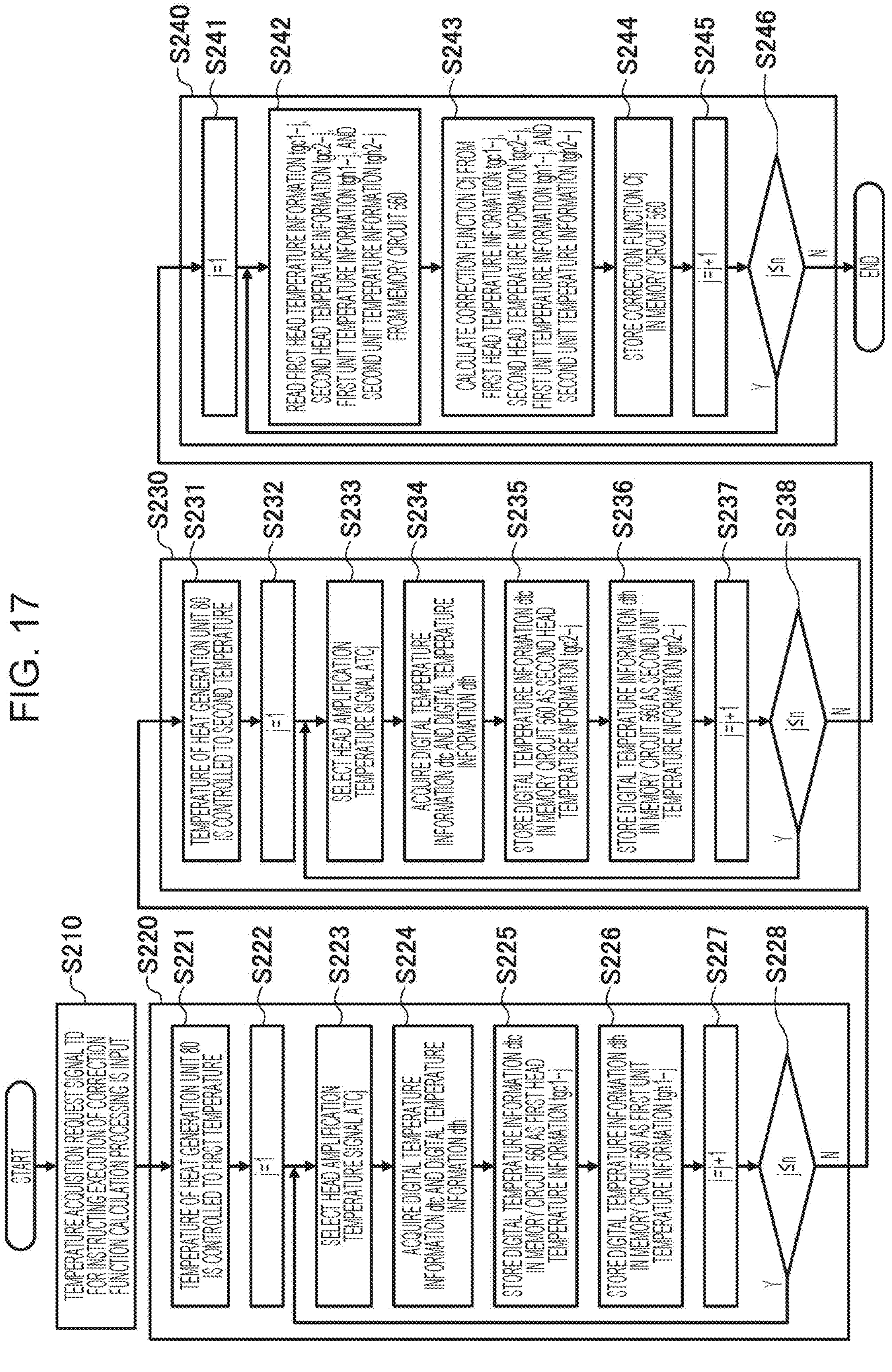
FIG. 17 is a diagram for describing an example of correction function calculation processing.

Next, a specific example of the correction function calculation processing described above will be described. FIG. 17 is a diagram for describing an example of the correction function calculation processing.

As illustrated in FIG. 17, when the temperature acquisition request signal TD for instructing execution of the correction function calculation processing is input from the control circuit 100 to the temperature information output circuit 26 (step S210), the liquid discharge apparatus 1 executes the correction function calculation processing. As the correction function calculation processing, first, first temperature information acquisition processing is executed in which the unit temperature information th included in the unit temperature signal TH output by the temperature measurement circuit 28 is acquired in association with each of the head temperature information tc1 to tcn included in the head temperature signals TC1 to TCn output by each of the print heads 22-1 to 22-*n* when the temperature of the heat generation unit 80 is the first temperature (step S220).

Specifically, in the first temperature information acquisition processing, the control circuit 100 outputs the control signal Ctrl-W for controlling the temperature of the heat generation unit 80 to the first temperature. As a result, the temperature of the heat generation unit 80 is controlled to the first temperature (step S221). Further, the temperature information output circuit 26 initializes a variable j to j=1 (step S222). That is, the temperature information output circuit 26 executes the first temperature information acquisition processing corresponding to the print head 22-1.

Thereafter, the control circuit 500 included in the temperature information output circuit 26 outputs the select signal Sel for selecting the head amplification temperature signal ATC1 obtained by amplifying the head temperature signal TC1 output by the print head 22-1 by the amplifier circuit 510-1, to the multiplexer 530 because the variable j is “1”. As a result, the multiplexer 530 selects the head amplification temperature signal ATC1 as the head amplification temperature signal ATCj (step S223), and outputs the head amplification temperature signal ATC1 as the selection temperature signal STC.

Thereafter, the control circuit 500 included in the temperature information output circuit 26 outputs the enable signal EN for enabling analog/digital conversion in the AD converter circuits 540 and 550. As a result, the AD converter circuit 540 outputs the digital temperature information dtc obtained by converting the selection temperature signal STC, which is the head amplification temperature signal ATC1, into a digital signal, and the AD converter circuit 550 outputs the digital temperature information dth obtained by converting the unit amplification temperature signal ATH, which is obtained by amplifying the unit temperature signal TH output by the temperature measurement circuit 28 by the amplifier circuit 520, into a digital signal. In addition, the control circuit 500 acquires the digital temperature information dtc output by the AD converter circuit 540 and the digital temperature information dth output by the AD converter circuit 550 (step S224).

Thereafter, the memory control section 508 included in the control circuit 500 outputs the memory control signal MA for storing the acquired digital temperature information dtc as first head temperature information tgc1-1 indicating the temperature corresponding to the print head 22-1, which is the print head 22-*j*, in the memory circuit 560 (step S225). In addition, the memory control section 508 included in the control circuit 500 outputs the memory control signal MA for storing the acquired digital temperature information dth as first unit temperature information tgh1-1 indicating the temperature of the head unit 20 when the first head temperature information tgc1-1 is acquired, in the memory circuit 560 (step S226). That is, the memory circuit 560 stores the temperature of the print head 22-1 during the period when the heat generation unit 80 generates heat at the first temperature and the temperature of the head unit 20 when the temperature of the print head 22-1 is acquired, in association with each other.

Thereafter, the temperature information output circuit 26 adds “1” to the variable j (step S227), and determines whether or not the variable j after the addition is equal to or less than “n” which is the total number of print heads 22 included in the head unit 20 (step S228). In addition, when the variable j is equal to or less than “n”, which is the total number of print heads 22 included in the head unit 20 (Y in step S228), the temperature information output circuit 26 repeatedly executes the processing of steps S223 to S228. Therefore, the temperature information output circuit 26 executes the above-described first temperature information acquisition processing with respect to each of the print heads 22-1 to 22-*n*. Thereafter, when the variable j exceeds “n” which is the total number of print heads 22 included in the head unit 20 (N in step S228), the temperature information output circuit 26 ends the first temperature information acquisition processing.

That is, in the first temperature information acquisition processing, the temperature of the print heads 22-1 to 22-*n* during the period when the heat generation unit 80 generates heat at the first temperature and the temperature of the head unit 20 when the temperature of each of the print heads 22-1 to 22-*n* is acquired are associated with each other and stored in the memory circuit 560.

Then, after the first temperature information acquisition processing is completed, second temperature information acquisition processing is executed in which the unit temperature information th included in the unit temperature signal TH output by the temperature measurement circuit 28 is acquired in association with each of the head temperature information tc1 to tcn included in the head temperature signals TC1 to TCn output by each of the print heads 22-1 to 22-*n* when the temperature of the heat generation unit 80 is the second temperature (step S230).

Specifically, in the second temperature information acquisition processing, the control circuit 100 outputs the control signal Ctrl-W for controlling the temperature of the heat generation unit 80 to the second temperature different from the first temperature. As a result, the temperature of the heat generation unit 80 is controlled to the second temperature (step S231). Further, the temperature information output circuit 26 initializes the variable j to j=1 (step S232). That is, the temperature information output circuit 26 executes the second temperature information acquisition processing corresponding to the print head 22-1.

Thereafter, the control circuit 500 included in the temperature information output circuit 26 outputs the select signal Sel for selecting the head amplification temperature signal ATC1 obtained by amplifying the head temperature signal TC1 output by the print head 22-1 by the amplifier circuit 510-1, to the multiplexer 530 because the variable j is “1”. As a result, the multiplexer 530 selects the head amplification temperature signal ATC1 as the head amplification temperature signal ATCj (step S233), and outputs the head amplification temperature signal ATC1 as the selection temperature signal STC.

Thereafter, the control circuit 500 included in the temperature information output circuit 26 outputs the enable signal EN for enabling analog/digital conversion in the AD converter circuits 540 and 550. As a result, the AD converter circuit 540 outputs the digital temperature information dtc obtained by converting the selection temperature signal STC, which is the head amplification temperature signal ATC1, into a digital signal, and the AD converter circuit 550 outputs the digital temperature information dth obtained by converting the unit amplification temperature signal ATH, which is obtained by amplifying the unit temperature signal TH output by the temperature measurement circuit 28 by the amplifier circuit 520, into a digital signal. In addition, the control circuit 500 acquires the digital temperature information dtc output by the AD converter circuit 540 and the digital temperature information dth output by the AD converter circuit 550 (step S234).

Thereafter, the memory control section 508 included in the control circuit 500 outputs the memory control signal MA for storing the acquired digital temperature information dtc as second head temperature information tgc2-1 indicating the temperature corresponding to the print head 22-1, which is the print head 22-*j*, in the memory circuit 560 (step S235). In addition, the memory control section 508 included in the control circuit 500 outputs the memory control signal MA for storing the acquired digital temperature information dth as second unit temperature information tgh2-1 indicating the temperature of the head unit 20 when the second head temperature information tgc2-1 is acquired, in the memory circuit 560 (step S236). That is, the memory circuit 560 stores the temperature of the print head 22-1 during the period when the heat generation unit 80 generates heat at the second temperature and the temperature of the head unit 20 when the temperature of the print head 22-1 is acquired, in association with each other.

Thereafter, the temperature information output circuit 26 adds "1" to the variable j (step S237), and determines whether or not the variable j after the addition is equal to or less than "n" which is the total number of print heads 22 included in the head unit 20 (step S238). In addition, when the variable j is equal to or less than "n", which is the total number of print heads 22 included in the head unit 20 (Y in step S238), the temperature information output circuit 26 repeatedly executes the processing of steps S233 to S238. Therefore, the temperature information output circuit 26 executes the above-described second temperature information acquisition processing with respect to each of the print heads 22-1 to 22-*n*. Thereafter, when the variable j exceeds "n" which is the total number of print heads 22 included in the head unit 20 (N in step S238), the temperature information output circuit 26 ends the second temperature information acquisition processing.

That is, in the second temperature information acquisition processing, the temperature of the print heads 22-1 to 22-*n* during the period when the heat generation unit 80 generates heat at the second temperature and the temperature of the head unit 20 when the temperature of each of the print heads 22-1 to 22-*n* is acquired are associated with each other and stored in the memory circuit 560.

Then, after the first temperature information acquisition processing and the second temperature information acquisition processing are completed, the temperature information output circuit 26 executes correction function acquisition processing in which the first head temperature information tgc1-1 to tgc1-*n*, the second head temperature information tgc2-1 to tgc2-*n*, the first unit temperature information tgh1-1 to tgh1-*n*, and the second unit temperature information tgh2-1 to tgh2-*n*, which are stored in the memory circuit, are sequentially read, and the correction functions Cf1 to Cfn corresponding to each of the print heads 22-1 to 22-*n* are calculated and stored in the memory circuit 560 (step S240).

Specifically, the correction function acquisition processing is executed after the first temperature information acquisition processing and the second temperature information acquisition processing can be performed. When the correction function acquisition processing is started, the temperature information output circuit 26 initializes the variable j to j=1 (step S241). That is, the temperature information output circuit 26 executes the calculation of the correction function Cf1 corresponding to the print head 22-1.

First, the memory control section 508 included in the temperature information output circuit 26 outputs, from the memory circuit 560, the memory control signal MA for reading the first head temperature information tgc1-1 as the first head temperature information tgc1-*j* corresponding to the print head 22-1 which is the print head 22-*j*, the second head temperature information tgc2-1 as the second head temperature information tgc2-*j*, the first unit temperature information tgh1-1 as the first unit temperature information tgh1-*j*, and the second unit temperature information tgh2-1 as the second unit temperature information tgh2-*j*. As a result, the first head temperature information tgc1-1, the second head temperature information tgc2-1, the first unit temperature information tgh1-1, and the second unit temperature information tgh2-1 are read from the memory circuit 560, and the memory control section 508 is input as the memory reading signal MR. That is, the control circuit 500 reads the first head temperature information tgc1-1, the second head temperature information tgc2-1, the first unit temperature information tgh1-1, and the second unit temperature information tgh2-1 from the memory circuit 560 (step S242).

The first head temperature information tgc1-1, the second head temperature information tgc2-1, the first unit temperature information tgh1-1, and the second unit temperature information tgh2-1, which are input to the memory control section 508, are input to the correction function arithmetic section 504. The correction function arithmetic section 504 calculates the correction function Cf1 as the correction function Cfj from the input first head temperature information tgc1-1, the second head temperature information tgc2-1, the first unit temperature information tgh1-1, and the second unit temperature information tgh2-1 (step S243).

Specifically, the correction function arithmetic section 504 calculates a linear function in which the temperature of the head unit 20 when the temperature of the print head 22-1 is the first head temperature information tgc1-1 is the first unit temperature information tgh1-1, and the temperature of the head unit 20 when the temperature of the print head 22-1 is the second head temperature information tgc2-1 is the second unit temperature information tgh2-1, as the correction function Cf1. That is, the correction function Cf1 of the present embodiment is a function having the digital temperature information dtc based on the head temperature information tc1 as a variable.

Note that, the correction function Cf1 calculated by the correction function arithmetic section 504 is not limited to the above-described linear function, and may calculate an approximate expression in which the temperature of the head unit 20 when the temperature of the print head 22-1 is the first head temperature information tgc1-1 is the first unit temperature information tgh1-1, and the temperature of the head unit 20 when the temperature of the print head 22-1 is the second head temperature information tgc2-1 is the second unit temperature information tgh2-1, as the correction function Cf1. Here, the above-described approximate expression may be an approximate expression of exponential approximation, an approximate expression of power approximation, an approximate expression of polynomial approximation, or the like, depending on the temperature characteristic of the resistance wiring 401.

After the calculation of the correction function Cf1 is completed in the correction function arithmetic section 504, the memory control section 508 generates the memory control signal MA for storing the calculated correction function Cf1 in the memory circuit 560 and outputs the generated memory control signal MA to the memory circuit 560. As a result, the correction function Cf1 is stored in the memory circuit 560. That is, the memory control section 508 stores the correction function Cf1 in the memory circuit 560 (step S244).

Thereafter, the temperature information output circuit 26 adds "1" to the variable j (step S245), and determines whether or not the variable j after the addition is equal to or less than "n" which is the total number of print heads 22 included in the head unit 20 (step S246). In addition, when the variable j is equal to or less than "n", which is the total number of print heads 22 included in the head unit 20 (Y in step S246), the temperature information output circuit 26 repeatedly executes the processing of steps S242 to S246. Therefore, the temperature information output circuit 26 calculates the correction functions Cf1 to Cfn corresponding to each of the print heads 22-1 to 22-*n*, and stores the correction functions Cf1 to Cfn in the memory circuit 560. Thereafter, when the variable j exceeds "n" which is the total number of print heads 22 included in the head unit 20 (N in step S246), the temperature information output circuit 26 ends the correction function acquisition processing and ends the correction function calculation processing.

As described above, the temperature information output circuit 26 stores the unit temperature information th included in the unit temperature signal TH input when the liquid discharge apparatus 1 is started up and the heat generation unit 80 generates heat at the first temperature as the first unit temperature information tgh1-1, stores the head temperature information tc1 included in the head temperature signal TC1 input when the heat generation unit 80 generates heat at the first temperature as the first head temperature information tgc1-1, stores the unit temperature information th included in the unit temperature signal TH input when the heat generation unit 80 generates heat at the second temperature as the second unit temperature information tgh2-1, and stores the head temperature information tc1 included in the head temperature signal TC1 input when the heat generation unit 80 generates heat at the second temperature as the second head temperature information tgc2-1.

The temperature information output circuit 26 calculates the correction function Cf1 based on the stored first unit temperature information tgh1-1, second unit temperature information tgh2-1, first head temperature information tgc1-1, and second head temperature information tgc2-1.

Figure 18:
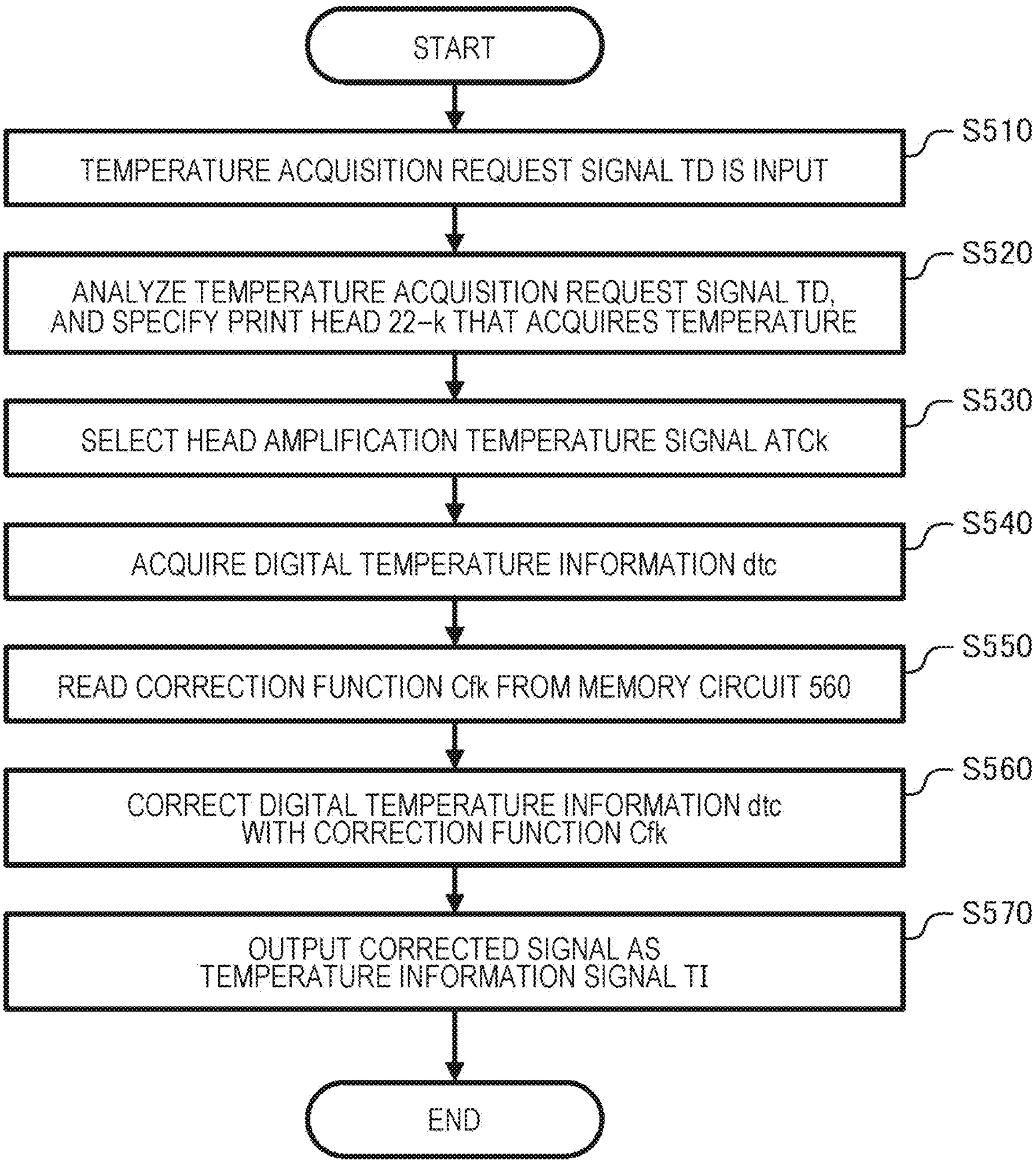
FIG. 18 is a diagram for describing an example of the temperature information output processing.

Next, a specific example of the above-described temperature information output processing will be described. FIG. 18 is a diagram for describing an example of the temperature information output processing.

As illustrated in FIG. 18, as the temperature acquisition request signal TD from the control circuit 100 for requesting the temperature information output circuit 26 to acquire the temperature of one of the plurality of print heads 22 is input during the period when the printing processing is executed (step S510), the temperature information output circuit 26 starts the temperature information output processing.

When the temperature acquisition request signal TD for requesting the temperature information output circuit 26 to acquire the temperature of any of the plurality of print heads 22 is input, the request analysis section 502 included in the control circuit 500 of the temperature information output circuit 26 analyzes the temperature acquisition request signal TD, and specifies the print head 22-*k* (k is any of 1 to n) that acquires the temperature among the plurality of print heads 22 (step S520). Thereafter, the temperature information output circuit 26 outputs, to the multiplexer 530, the select signal Sel for selecting the head amplification temperature signal ATCk obtained by amplifying the head temperature signal TCk corresponding to the print head 22-*k* by the amplifier circuit 510-*k*. As a result, the multiplexer 530 selects the head amplification temperature signal ATCk as the head amplification temperature signal ATCk (step S530), and outputs the head amplification temperature signal ATCk as the selection temperature signal STC.

Thereafter, the control circuit 500 included in the temperature information output circuit 26 outputs the enable signal EN for enabling analog/digital conversion in the AD converter circuit 540. As a result, the AD converter circuit 540 outputs the digital temperature information dtc obtained by converting the selection temperature signal STC, which is the head amplification temperature signal ATCk, into a digital signal. In addition, the control circuit 500 acquires the digital temperature information dtc output by the AD converter circuit 540 (step S540). That is, the control circuit 500 acquires the digital temperature information dtc corresponding to the head temperature information tck indicating the temperature of the print head 22-*k*.

In addition, the memory control section 508 included in the control circuit 500 outputs the memory control signal MA for reading the correction function Cfk in the correction functions Cf1 to Cfn stored in the memory circuit 560. As a result, the correction function Cfk is read from the memory circuit 560 and input to the memory control section 508 as the memory reading signal MR. That is, the control circuit 500 reads the correction function Cfk from the memory circuit 560 (step S550).

The correction output section 506 included in the control circuit 500 performs correction by substituting the digital temperature information dtc corresponding to the head temperature information tck indicating the temperature of the print head 22-*k* into the correction function Cfk. That is, the correction output section 506 corrects the digital temperature information dtc corresponding to the head temperature information tck indicating the temperature of the print head 22-*k* with the correction function Cfk (step S560). Then, the correction output section 506 included in the control circuit 500 generates and outputs the temperature information signal TI including the corrected digital temperature information dtc as information indicating the temperature of the print head 22-*k*. That is, the correction output section 506 outputs the corrected signal as the temperature information signal TI (step S570). Consequently, the temperature information output circuit 26 ends the temperature information output processing.

That is, the temperature information output circuit 26 corrects the head temperature information tc1 included in the head temperature signal TC1, which is input at the time of execution of the printing processing for discharging the ink by the print head 22-1 and at the time of discharging the liquid, based on the first unit temperature information tgh1-1, the second unit temperature information tgh2-1, the first head temperature information tgc1-1, and the second head temperature information tgc2-1, and outputs the corrected head temperature information tc1 as the temperature information signal TI. Specifically, the temperature information output circuit 26 corrects the head temperature information tc1 included in the head temperature signal TC1 input at the time of execution of printing processing for discharging the ink by the print head 22-1 and at the time of discharging the liquid, by using the correction function Cf1 calculated based on the first unit temperature information tgh1-1, the second unit temperature information tgh2-1, the first head temperature information tgc1-1, and the second head temperature information tgc2-1, and outputs the corrected head temperature information tc1 as the temperature information signal TI.

Here, the drive signal COM is an example of a drive signal, and considering that the drive signal VOUT is generated by selecting or deselecting the signal waveform included in the drive signal COM, the drive signal VOUT is also an example of a drive signal, the heat generation unit 80 is an example of a heat generation mechanism, the temperature measurement circuit 28 is an example of a unit temperature measurement circuit, the head temperature information tc, which is any one of the head temperature information tc1 to tcn, is an example of head temperature information, the head temperature signal TC, which is any one of the head temperature signal TC1 to Tcn, is an example of head temperature signal, the electrode 360 is an example of a first electrode, the electrode 380 is an example of a second electrode, the direction along the Z axis is an example of a stacking direction, the +Z side in the direction along the Z axis is an example of one side in the stacking direction, the −Z side in the direction along the Z axis is an example of the other side in the stacking direction, the temperature measurement circuit 24 is an example of a head temperature measurement section, one of the first temperature and the second temperature is an example of a predetermined temperature, any one of the first unit temperature information tgh1-1 to tgh1-*n* and the second unit temperature information tgh2-1 to tgh2-*n* is an example of reference unit temperature information, any one of the first unit temperature information tgh1-1 to tgh1-*n* is an example of first reference unit temperature information, any one of the second unit temperature information tgh2-1 to tgh2-*n* is an example of second reference unit temperature information, any one of the first head temperature information tgc1-1 to tgc1-*n* and the second head temperature information tgc2-1 to tgc2-*n* is an example of reference head temperature information, any one of the first head temperature information tgc1-1 to tgc1-*n* is an example of first reference head temperature information, any one of the second head temperature information tgc2-1 to tgc2-*n* is an example of second reference head temperature information, and any one of the correction functions Cf1 to Cfn is an example of a correction function.

3. Operational Effect

In the liquid discharge apparatus 1 configured as described above, the head unit 20 includes the print head 22, the print head 22 includes the piezoelectric element 60 which includes the electrode 360, the electrode 380, and the piezoelectric body 370, in which, in the direction along the Z axis in which the electrode 360, the electrode 380, and the piezoelectric body 370 are stacked, the piezoelectric body 370 is positioned between the electrode 360 and the electrode 380, and which is driven by receiving the drive signal COM; the vibration plate 350 that is positioned on the +Z side of the piezoelectric element 60 in the direction along the Z axis, and is deformed by the drive of the piezoelectric element 60; the pressure chamber substrate 310 that is positioned on the +Z side of the vibration plate 350 in the direction along the Z axis, and is provided with the pressure chamber 312 of which the volume changes due to the deformation of the vibration plate 350; the nozzle 321 that discharges the liquid corresponding to the change in volume of the pressure chamber 312; and the temperature measurement circuit 24 including the resistance wiring 401 that is positioned on the −Z side of the vibration plate 350 in the direction along the Z axis and acquires the head temperature information tc corresponding to the temperature of the corresponding pressure chamber 312 from among the plurality of pieces of head temperature information tc. That is, the resistance wiring 401 that configures at least a part of the temperature measurement circuit 24 that measures the temperature of the print head 22 is disposed in the vicinity of the pressure chamber 312 in which the ink discharged from the nozzle 321 is stored in the print head 22. As a result, the temperature acquisition accuracy of the pressure chamber 312 in the temperature measurement circuit 24, that is, the temperature acquisition accuracy of the ink stored in the pressure chamber 312 is improved.

On the other hand, since the temperature measurement circuit 24 acquires a change in an electric resistance value due to the temperature of the resistance wiring 401 formed on the vibration plate 350 as the temperature of the ink stored in the pressure chamber 312, from the viewpoint of acquiring a remarkable change in electric resistance value due to temperature, the wiring length of the resistance wiring 401 is preferably long, and the resistance wiring 401 is formed inside the print head 22. Therefore, from the viewpoint of the reduction of the size of the print head 22, the wiring width of the wiring pattern of the resistance wiring 401 is preferably small. Therefore, the resistance wiring 401 is configured as a narrow and long wiring pattern. Therefore, there is a concern that a large variation in the resistance value occurs.

On the other hand, in the liquid discharge apparatus 1 of the present embodiment, the head unit 20 includes the temperature measurement circuit 28 that measures the temperature of the head unit 20 as the unit temperature information th and outputs the unit temperature signal TH including the measured unit temperature information th, and the temperature information output circuit 26 corrects the head temperature information tc output as the temperature information signal TI based on the unit temperature information th included in the unit temperature signal TH input when the heat generation unit 80 generates heat at least at one of the first temperature and the second temperature, and the head temperature information tc acquired by the temperature measurement circuit 24. That is, the head unit 20 of the present embodiment includes the temperature measurement circuit 28 that is provided separately from the temperature measurement circuit 24 provided inside the print head 22, and measures the temperature of the entire head unit 20, and the temperature information output circuit 26 corrects the unit temperature information th indicating a temperature of the head unit 20 output by the temperature measurement circuit 28 during the period when the heat generation unit 80 generates heat at a known temperature, which is the first temperature or the second temperature, and the head temperature information tc output as the temperature information signal TI based on the head temperature information tc indicating the temperature of the print head 22 output by the temperature measurement circuit 24 provided inside the print head 22. As a result, the temperature information output circuit 26 acquires the temperature change generated by heat generation of the heat generation unit 80 by the temperature measurement circuit 28 and the temperature measurement circuit 24, and the temperature information output circuit 26 corrects the head temperature information tc acquired by the temperature measurement circuit 24 with the unit temperature information th acquired by the temperature measurement circuit 28 as a reference. Thus, even when a variation in the temperature measurement characteristic of the temperature measurement circuit 24 provided inside the print head 22 occurs, the temperature information output circuit 26 can appropriately correct and output the temperature information signal TI corresponding to the temperature of the print head 22. That is, the temperature information output circuit 26 can output the temperature information signal TI in which the influence of the variation in the temperature measurement characteristic of the temperature measurement circuit 24 is reduced, and the temperature information signal TI that accurately reflects the temperature of the print head 22.

Further, as described above, in the liquid discharge apparatus 1 of the present embodiment, the temperature information output circuit 26 provided outside the print head 22 corrects the variation in the characteristics of the temperature measurement circuit 24 provided inside the print head 22 based on the temperature measurement result of the temperature measurement circuit 28 provided outside the print head 22. Therefore, the temperature information output circuit 26 can perform correction including the variation in the head temperature signal TC caused by the variation in the path through which the head temperature signal TC output by the temperature measurement circuit 24 propagates and the variation in the circuit elements provided in the path. As a result, the correction accuracy of the head temperature information tc in the temperature information output circuit 26 is further improved, and as a result, the temperature information output circuit 26 can output the temperature information signal TI that more accurately reflects the temperature of the print head 22.

In addition, in the liquid discharge apparatus 1 of the present embodiment, the temperature information output circuit 26 stores the unit temperature information th and the head temperature information tc which are input when the heat generation unit 80 generates heat at least at one of the first temperature and the second temperature during the period when the ink is not discharged at the time of start-up of the liquid discharge apparatus 1, and corrects the head temperature information tc input at the time of discharging the liquid during the period when the liquid discharge apparatus 1 executes the printing processing based on the stored unit temperature information th and head temperature information tc. As a result, when the unit temperature information th and the head temperature information tc, which are the references for correction, are acquired, the influence of self heat generation of the print head 22 is reduced. As a result, it is possible to reduce the temperature difference occurring between the temperature defined by the unit temperature information th acquired as the correction reference and the temperature defined by the head temperature information tc acquired as the correction reference. Therefore, the correction accuracy when the temperature information output circuit 26 corrects the head temperature information tc is further improved, the temperature information output circuit 26 can output the temperature information signal TI in which the influence of the variation in the temperature measurement characteristic of the temperature measurement circuit 24 is further reduced, and the temperature information signal TI that more accurately reflects the temperature of the print head 22.

In addition, in the liquid discharge apparatus 1 of the present embodiment, the temperature information output circuit 26 calculates the correction function that corrects the head temperature information tc output as the temperature information signal TI, based on the unit temperature information th and the head temperature information tc, which are input when the heat generation unit 80 generates heat at the first temperature, and the unit temperature information th and the head temperature information tc input when the heat generation unit 80 generates heat at the second temperature different from the first temperature, and outputs the corrected head temperature information tc based on the calculated correction function. That is, the temperature information output circuit 26 corrects the temperature measured by the temperature measurement circuit 24 provided inside the print head 22 with a plurality of temperatures measured by the temperature measurement circuit 28 as a reference. Accordingly, the temperature information output circuit 26 can output the temperature information signal TI in which variation in measurement accuracy of the temperature measurement circuit 24 provided inside the print head 22 is further reduced, and can output the temperature information signal TI in which the influence of the variation in the temperature measurement characteristic of the temperature measurement circuit 24 is further reduced, and the temperature information signal TI that more accurately reflects the temperature of the print head 22.

At this time, the temperature information output circuit 26 corrects the head temperature information tc output as the temperature information signal TI by using a correction function calculated based on the plurality of temperatures measured by the temperature measurement circuit 28. As a result, the temperature information output circuit 26 can correct the head temperature information tc output as the temperature information signal TI by using an optimum correction value corresponding to the temperature of the print head 22 based on the acquired head temperature information tc. As a result, it is possible to output the temperature information signal TI in which the influence of the variation in the temperature measurement characteristic of the temperature measurement circuit 24 is reduced, and the temperature information signal TI that more accurately reflects the temperature of the print head 22.

In addition, in the liquid discharge apparatus 1 of the present embodiment, the heat generation unit 80 is configured to include a ceramic heater. As a result, the temperature rise speed and the temperature decrease speed of the heater 84 can be increased, and the time required to calculate the correction value of the temperature information signal TI can be shortened.

Further, in the liquid discharge apparatus 1 of the present embodiment, the heat generation unit 80 also serves as a so-called platen heater for drying the medium P. As a result, it is not necessary to add a new configuration and it is possible to correct the temperature information signal TI output by the temperature information output circuit 26.

The embodiments and the modification examples were described above, but the present disclosure is not limited to the embodiments, and can be implemented in various aspects without departing from the gist thereof. For example, the above-described embodiments can also be appropriately combined with each other.

The present disclosure includes substantially the same configurations (for example, configurations having the same functions, methods, and results, or configurations having the same objects and effects) as the configurations described in the embodiments. Further, the present disclosure includes configurations in which non-essential parts of the configuration described in the embodiments are replaced. In addition, the present disclosure includes configurations that achieve the same operational effects or configurations that can achieve the same objects as those of the configurations described in the embodiment. Further, the present disclosure includes configurations in which a known technology is added to the configurations described in the embodiments.

The following contents are derived from the above-described embodiments.

According to an aspect, there is provided a liquid discharge apparatus including: a head unit that discharges a liquid onto a medium based on a drive signal; and a heat generation mechanism, in which the head unit includes a print head that discharges the liquid based on the drive signal, a unit temperature measurement circuit that measures a temperature of the head unit as unit temperature information and outputs a unit temperature signal including the unit temperature information, and a temperature information output circuit to which the unit temperature signal and a head temperature signal including head temperature information corresponding to a temperature of the print head are input and which outputs a temperature information signal, the print head includes a piezoelectric element which includes a first electrode, a second electrode, and a piezoelectric body, in which the piezoelectric body is positioned between the first electrode and the second electrode in a stacking direction in which the first electrode, the second electrode, and the piezoelectric body are stacked, and which is driven by receiving the drive signal, a vibration plate that is positioned on one side of the piezoelectric element in the stacking direction, and is deformed by driving the piezoelectric element, a pressure chamber substrate that is positioned on one side of the vibration plate in the stacking direction, and is provided with a pressure chamber of which a volume changes due to deformation of the vibration plate, a nozzle that discharges the liquid in response to a change in the volume of the pressure chamber, and a head temperature measurement section that is positioned on the other side of the vibration plate in the stacking direction, measures the head temperature information corresponding to a temperature of the pressure chamber, and outputs the head temperature information as the head temperature signal, and the temperature information output circuit corrects the head temperature information output as the temperature information signal based on the unit temperature information and the head temperature information which are input when the heat generation mechanism generates heat at a predetermined temperature.

According to this liquid discharge apparatus, since the head temperature measurement section that measures the head temperature information corresponding to the temperature of the pressure chamber is positioned in the vicinity of the pressure chamber, the temperature measurement section can measure the temperature of the pressure chamber, which is the temperature of the liquid stored in the pressure chamber, with high accuracy.

Further, according to the liquid discharge apparatus, the unit temperature measurement circuit that measures the temperature of the head unit is provided in addition to the head temperature measurement section that measures the temperature of the pressure chamber, and the temperature information output circuit corrects the temperature information signal indicating the temperature of the print head based on the unit temperature information output by the unit temperature measurement circuit and the head temperature information output by the head temperature measurement section during the period when the heat generation mechanism generates heat at a predetermined temperature. That is, the temperature change generated by the heat generation of the heat generation mechanism is acquired by the unit temperature measurement circuit provided outside the print head and the head temperature measurement section provided inside the print head, and the temperature information output circuit corrects the head temperature information measured by the head temperature measurement section provided inside the print head with the unit temperature information measured by the unit temperature measurement circuit provided outside the print head as a reference. As a result, even when a variation in the temperature measurement characteristic of the head temperature measurement section provided inside the print head occurs, the temperature information output circuit can correct the variation and output the temperature information signal corresponding to the temperature of the print head.

In the liquid discharge apparatus according to the aspect, the temperature information output circuit may store the unit temperature information included in the unit temperature signal input at a time of start-up and when the heat generation mechanism generates heat at a predetermined temperature as reference unit temperature information, may store the head temperature information included in the head temperature signal input at a time of start-up and when the heat generation mechanism generates heat at the predetermined temperature as reference head temperature information, and may correct the head temperature information included in the head temperature signal input at a time of liquid discharge in which the print head discharges the liquid based on the reference unit temperature information and the reference head temperature information, and output the corrected head temperature information.

According to this liquid discharge apparatus, the unit temperature measurement circuit provided outside the print head and the head temperature measurement section provided inside the print head acquire the temperature change generated by the heat generated by the heat generation mechanism at the time of start-up, and accordingly, the influence of self heat generation of the print head is reduced. As a result, when the temperature information output circuit corrects the head temperature information measured by the head temperature measurement section provided inside the print head with the unit temperature information measured by the unit temperature measurement circuit provided outside the print head as a reference, the correction accuracy is improved. Therefore, the correction accuracy of the variation in the temperature measurement characteristic of the head temperature measurement section by the temperature information output path is improved, and the accuracy of the temperature information signal corresponding to the temperature of the print head is further improved.

In the liquid discharge apparatus according to the aspect, the temperature information output circuit may store the unit temperature information included in the unit temperature signal input when the heat generation mechanism generates heat at a first temperature as the predetermined temperature as first reference unit temperature information, may store the head temperature information included in the head temperature signal input when the heat generation mechanism generates heat at the first temperature as first reference head temperature information, may store the unit temperature information included in the unit temperature signal input when the heat generation mechanism generates heat at a second temperature as the predetermined temperature as second reference unit temperature information, may store the head temperature information included in the head temperature signal input when the heat generation mechanism generates heat at the second temperature as second reference head temperature information, may calculate a correction function based on the stored first reference unit temperature information, second reference unit temperature information, first reference head temperature information, and second reference head temperature information, and may correct the head temperature information included in the head temperature signal input at a time of liquid discharge in which the print head discharges a liquid by using the correction function, and output the corrected head temperature information.

According to this liquid discharge apparatus, the temperature information output circuit corrects the head temperature information measured by the head temperature measurement section provided inside the print head with the unit temperature information measured by the unit temperature measurement circuit provided outside the print head as a reference based on the first reference unit temperature information and the first reference head temperature information, which are acquired by the heat generation mechanism at the first temperature, and the second reference unit temperature information and the second reference head temperature information, which are acquired by the heat generation mechanism at the second temperature, and accordingly, the correction accuracy of variation in the temperature measurement characteristic of the head temperature measurement section by the temperature information output circuit is further improved, and the accuracy of the temperature information signal corresponding to the temperature of the print head is further improved.

In addition, according to this liquid discharge apparatus, the head temperature information measured by the head temperature measurement section provided inside the print head is corrected with the unit temperature information measured by the unit temperature measurement circuit provided outside the print head using the correction function as a reference. As a result, the temperature information output circuit can make a correction with the optimum correction value corresponding to the temperature of the print head based on the acquired head temperature information. As a result, the correction accuracy of the variation in the temperature measurement characteristic of the head temperature measurement section by the temperature information output circuit is improved, and the accuracy of the temperature information signal corresponding to the temperature of the print head is further improved.

In the liquid discharge apparatus according to the aspect, the heat generation mechanism may include a ceramic heater.

According to this liquid discharge apparatus, the speed of temperature control of the heat generation mechanism can be increased by using the ceramic heater as the heat generation mechanism. As a result, the correction of the temperature information signal corresponding to the temperature of the print head by the temperature information output circuit can be executed in a short time.

In the liquid discharge apparatus according to the aspect, the heat generation mechanism may have a medium heating function of drying the medium.

According to the liquid discharge apparatus, it is not necessary to provide a new configuration as a heat generation mechanism, and the size of the liquid discharge apparatus can be reduced.

In the liquid discharge apparatus according to the aspect, the heat generation mechanism may be positioned to overlap at least a part of the print head in a discharge direction in which the liquid is discharged from the nozzle.

According to this liquid discharge apparatus, the head temperature measurement section provided in the print head and the unit temperature measurement circuit provided in the head unit including the print head are positioned in the vicinity of the heat generation mechanism, and accordingly, it is possible to accurately detect the temperature conversion of the heat generation mechanism. As a result, the correction accuracy of the temperature information signal corresponding to the temperature of the print head by the temperature information output circuit is further improved.

In the liquid discharge apparatus according to the aspect, the print head may include a nozzle plate in which the nozzle is formed, and a shortest distance between the nozzle plate and the heat generation mechanism may be less than 1 mm.

According to this liquid discharge apparatus, the head temperature measurement section provided in the print head and the unit temperature measurement circuit provided in the head unit including the print head are positioned in the vicinity of the heat generation mechanism, and accordingly, it is possible to accurately detect the temperature conversion of the heat generation mechanism. As a result, the correction accuracy of the temperature information signal corresponding to the temperature of the print head by the temperature information output circuit is further improved.

In the liquid discharge apparatus according to the aspect, the head temperature measurement section may have a wiring provided on the surface on the other side of the vibration plate in the stacking direction and containing platinum.

Platinum has a large change in resistance value due to temperature, and has high stability and accuracy. Furthermore, platinum also has high linearity of a change in resistance value with respect to a temperature change. According to the liquid discharge apparatus, since the platinum wiring is included as the head temperature measurement section, the temperature measurement accuracy in the head temperature measurement section is further improved.

What is claimed is:

1. A liquid discharge apparatus comprising:

a head unit that discharges a liquid onto a medium based on a drive signal; and a heat generation mechanism, wherein the head unit includes a print head that discharges the liquid based on the drive signal, a unit temperature measurement circuit that measures a temperature of the head unit as unit temperature information and outputs a unit temperature signal including the unit temperature information, and a temperature information output circuit to which the unit temperature signal and a head temperature signal including head temperature information corresponding to a temperature of the print head are input and which outputs a temperature information signal, the print head includes a piezoelectric element which includes a first electrode, a second electrode, and a piezoelectric body, in which the piezoelectric body is positioned between the first electrode and the second electrode in a stacking direction in which the first electrode, the second electrode, and the piezoelectric body are stacked, and which is driven by receiving the drive signal, a vibration plate that is positioned on one side of the piezoelectric element in the stacking direction, and is deformed by driving the piezoelectric element, a pressure chamber substrate that is positioned on one side of the vibration plate in the stacking direction, and is provided with a pressure chamber of which a volume changes due to deformation of the vibration plate, a nozzle that discharges the liquid in response to a change in the volume of the pressure chamber, and a head temperature measurement section that is positioned on the other side of the vibration plate in the stacking direction, measures the head temperature information corresponding to a temperature of the pressure chamber, and outputs the head temperature information as the head temperature signal, and the temperature information output circuit corrects the head temperature information output as the temperature information signal based on the unit temperature information and the head temperature information which are input when the heat generation mechanism generates heat at a predetermined temperature.

2. The liquid discharge apparatus according to claim 1, wherein the temperature information output circuit stores the unit temperature information included in the unit temperature signal input at a time of start-up and when the heat generation mechanism generates heat at a predetermined temperature as reference unit temperature information, stores the head temperature information included in the head temperature signal input at a time of start-up and when the heat generation mechanism generates heat at the predetermined temperature as reference head temperature information, and corrects the head temperature information included in the head temperature signal input at a time of liquid discharge in which the print head discharges the liquid based on the reference unit temperature information and the reference head temperature information, and outputs the corrected head temperature information.

3. The liquid discharge apparatus according to claim 1, wherein the temperature information output circuit stores the unit temperature information included in the unit temperature signal input when the heat generation mechanism generates heat at a first temperature as the predetermined temperature as first reference unit temperature information, stores the head temperature information included in the head temperature signal input when the heat generation mechanism generates heat at the first temperature as first reference head temperature information, stores the unit temperature information included in the unit temperature signal input when the heat generation mechanism generates heat at a second temperature as the predetermined temperature as second reference unit temperature information, stores the head temperature information included in the head temperature signal input when the heat generation mechanism generates heat at the second temperature as second reference head temperature information, calculates a correction function based on the stored first reference unit temperature information, second reference unit temperature information, first reference head temperature information, and second reference head temperature information, and corrects the head temperature information included in the head temperature signal input at a time of liquid discharge in which the print head discharges a liquid by using the correction function, and outputs the corrected head temperature information.

4. The liquid discharge apparatus according to claim 1, wherein the heat generation mechanism includes a ceramic heater.

5. The liquid discharge apparatus according to claim 1, wherein the heat generation mechanism has a medium heating function of drying the medium.

6. The liquid discharge apparatus according to claim 5, wherein the heat generation mechanism is positioned to overlap at least a part of the print head in a discharge direction in which the liquid is discharged from the nozzle.

7. The liquid discharge apparatus according to claim 6, wherein the print head includes a nozzle plate in which the nozzle is formed, and a shortest distance between the nozzle plate and the heat generation mechanism is less than 1 mm.

8. The liquid discharge apparatus according to claim 1, wherein the head temperature measurement section has a wiring provided on the surface on the other side of the vibration plate in the stacking direction and containing platinum.

* * * * *